(12) United States Patent
Tu et al.

(10) Patent No.: US 7,545,311 B2
(45) Date of Patent: Jun. 9, 2009

(54) METHOD AND SYSTEM FOR PREDICTING AIR-TO-SURFACE TARGET MISSILE

(75) Inventors: Po-Jen Tu, Taipei (TW); Jean-Fu Kiang, Taipei (TW)

(73) Assignee: National Taiwan University, Taipei (TW)

( * ) Notice: Subject to any disclaimer, the term of this patent is extended or adjusted under 35 U.S.C. 154(b) by 33 days.

(21) Appl. No.: 12/003,090

(22) Filed: Dec. 20, 2007

(65) Prior Publication Data

US 2009/0085793 A1 Apr. 2, 2009

(30) Foreign Application Priority Data

Oct. 2, 2007 (TW) ............................... 96136878 A

(51) Int. Cl.
*G01S 13/66* (2006.01)
(52) U.S. Cl. ..................... 342/95; 342/106; 342/107; 342/126; 342/130; 342/140; 342/195
(58) Field of Classification Search ............... 342/59, 342/62, 90, 95–97, 106–109, 113–115, 126, 342/130, 133, 139, 140, 145–147, 195
See application file for complete search history.

(56) References Cited

U.S. PATENT DOCUMENTS

| | | | | |
|---|---|---|---|---|
| 5,212,490 A | * | 5/1993 | Nelson et al. | 327/185 |
| 5,313,212 A | * | 5/1994 | Ruzicka | 342/101 |
| 5,604,683 A | * | 2/1997 | Roecker | 342/378 |
| 6,411,249 B1 | * | 6/2002 | Rose | 342/13 |
| 7,002,511 B1 | * | 2/2006 | Ammar et al. | 342/134 |
| 7,185,844 B2 | * | 3/2007 | Yanushevsky | 244/3.15 |
| 7,394,046 B2 | * | 7/2008 | Olsson et al. | 244/3.1 |

* cited by examiner

*Primary Examiner*—John B Sotomayor
(74) *Attorney, Agent, or Firm*—Rosenberg, Klein & Lee

(57) ABSTRACT

A method and system for predicting a trajectory of an air-to-surface target missile is provided, including detecting a plurality of echo wave signals from the target missile through a plurality of sensors deployed at various locations relative to the target missile, extracting at least one range distance and at least one radial velocity, respectively, from the detected echo wave signals from the sensors by using a hybrid FSK/LFM unit, using a two-stage Kalman filter to filter the computed range distance and radial velocity to obtain a relative distance, a relative velocity and a relative acceleration, respectively, of the target missile, and finally applying trilateration on the relative distance, relative velocity and relative acceleration of the target missile from each two-stage Kalman filter to obtain a location, velocity and acceleration along the x, y, z directions.

9 Claims, 26 Drawing Sheets

METHOD AND SYSTEM FOR PREDICTING AIR-TO-SURFACE TARGET MISSILE

FIELD OF THE INVENTION

The present invention relates to an approach of air-to-surface missile detection and, more particularly, to a method and system for precisely predicting a trajectory of an air-to-surface target missile and accelerating the estimation of the target missile position.

BACKGROUND OF THE INVENTION

A defense system against an air-to-surface missile (ASM) incorporates many types of sensors, such as image sensor, lidar, and radar, for detecting the location, velocity and acceleration of the target ASM.

The image sensors have low capability of sensing depth and high capacity of target discrimination than lidar and radar. The radar shows limited lateral spatial information, and has a narrow field of view and a reduced resolution at large distance. Although the lidar has a wide field of view, the lidar has low capacity of target discrimination and also suffers from high clustering error.

Precise detection of a high-speed target missile is the key to an effective missile defense system. Several methods have been disclosed to trilaterate a specific target based on multiple radar detections. For example, a target can be trilaterated based on the echo wave signal of the multiple frequency-modulated continuous wave (FMCW).

Kalman filters are commonly used to track maneuvering target. A one-stage linear Kalman filter estimates the relative range and relative velocity based on the measurement data of relative range. However, the acceleration cannot be accurately estimated when the target is making a turn in a short period.

A two-stage linear Kalman filter is similar to the one-stage linear Kalman filter, except with a new bias vector to estimate the relative acceleration. However, the convergence time is too long to be of practical use.

An extended Kalman filter can be used to estimate all the kinetic parameters of the target using only one sensor. However, the error of some parameters can be too large when the target is making a turn. Many methods for missile detection are disclosed in prior arts. For example, one prior reference disclosed a method using an antenna array to apply the maximum likelihood estimation (MLE) to obtain the normalized spatial and Doppler frequency of the echo signal of the target, and map to the direction and relative velocity of the target. However, this method requires 64 samples, which requires more time. As an antenna array is used, the observed values from plural sensors must be computed simultaneously; thus, the computation is more complicated.

Another prior reference disclosed a method using the extended Kalman filter and recursive prediction error method to compute the relative acceleration with error only half that of using extended Kalman filter alone. However, the variance of the result from this method is large, and thus, the result is not sufficiently stable.

Yet another prior reference disclosed a method using a two-stage Kalman filter to obtain the directional components of the location. However, this method is only applicable to predicting the location when the relative acceleration is known, and is not applicable to predicting the precise location of the next time.

Yet another prior reference disclosed a method using matched filter to apply planar transformation of distance and velocity to find the most concentrated point, called initial distance $r_0$ and velocity $v_0$, under the condition of scanning the known relative velocity range. Although the relative velocity range of the target is known, the number of samples can be controlled within 30 with improved precision. However, there is still room for further improvement as 30 samples and planar transformations are still considered complicated.

Another prior reference disclosed a method using linear frequency modulation (LFM) with fast MLE to obtain the target location. This method requires Hough transformation for rough estimation and Newton method for obtaining more accurate solution. This method is unable to obtain the acceleration, and requires more time to measure and compute.

Yet another prior reference disclosed a method combining frequency shift key (FSK) and LFM. This method requires a sensor to alternately receiving and transmitting two sets of signals with different frequencies. Although this method is fast, the method cannot obtain the relative acceleration of the target.

Yet another prior reference disclosed a method using plural, for example 128, received samples to obtain the correlation and then compute the relative velocity and relative acceleration. As more received samples are used, this method requires more time.

Another prior reference disclosed a method multiplying the current received signal with the signal of the previous time, and through the transformations to compute the relative velocity and the relative acceleration. This method also requires N received samples.

Yet another prior reference disclosed a method by substituting two-stage Kalman filter with robust two-stage Kalman filter so that the application is simplified. However, this architecture is a linear system, and it remains a problem for applicability to non-linear system.

Yet another prior reference disclosed a method using trajectory tracking technology. Through the observed distance r and velocity v, Kalman filter is used to computer x, y, x, $v_x$, $v_y$ and $v_z$. The first approach uses plural sensors to compute the intersection of the distance and the variance of the intersection. Then, the linear Kalman filter is used for tracking. The advantages of this approach are the clear workload distribution and the high precision of the computation. However, the amount of computation is high and the ghost targets may occur. The second approach is to use the pre-computed distance r and velocity v to track through the extended Kalman filter in a nonlinear manner. Because each sensor can compute a target, the ghost targets are less likely to occur. The third approach is to use only the distance r to track through the extended Kalman filter in a nonlinear manner. This approach is simple and fast, but the precision of $v_x$ and $v_y$ will be reduced.

Yet another prior reference disclosed a method using standard Kalman filter to estimate a fixed relative acceleration after the relative location and the velocity estimation. However, this method takes more time to converge.

Yet another prior reference disclosed a method directly using the two-stage extended Kalman filter to obtain x, y, z, $v_x$, $v_y$, $v_z$, $a_x$, $a_y$, and $a_z$ from the observed distance r and velocity v. However, this method does not perform well in the precision of $a_x$, $a_y$, and $a_z$.

Yet another prior reference disclosed a method using the three previous observations to predict the relative acceleration $a_x$, $a_y$, and $a_z$. Then, a weighting factor is used to re-modify the x, y, z, $v_x$, $v_y$, and $v_z$. This method has high accuracy in linear acceleration, but has a low accuracy in acceleration when the target missile makes turns.

Another prior reference disclosed a method first computing x, y, z, and then using the linear Kalman filter to estimate x, y, z, $v_x$, $v_y$, and $v_z$. Under the condition that the relative acceleration is known, this method is applicable only to location detection, not to location prediction of the next time.

U.S. Pat. No. 5,051,751 disclosed a method of using the Kalman to estimate the location and velocity of a flying target. By using the Kalman filter to establish a measurement architecture and using a sensor architecture to obtain a sensor measurement, the sensor measurement is transformed to the measurement architecture, and the value is used to update the Kalman filter. The position/velocity error states are used to calibrate the trajectory model for the prediction at the next time.

U.S. Pat. No. 5,208,757 disclosed a system of determining the flying target location. The first memory includes different types of landmarks, and the second memory includes the location of the landmarks. By using a sensor to receive the signal from the landmarks, the system then uses the Kalman filter to compute the relative location of the flying target.

U.S. Pat. No. 5,525,995 disclosed a radar system of detecting the location and trajectory of the target using Doppler effect. By using a nonlinear least square (NLS) estimator to detect the initial velocity and initial location of the target, the system then uses the Kalman filter to predict the trajectory. The difference between the measurement and the Doppler-effect estimation is then used as in index to the predicted trajectory.

U.S. Pat. No. 6,082,666 disclosed a system of accurate prediction of vertical velocity and height of missiles. The system can be installed on a missile to combine with Kalman filter application. The Kalman filter consists of two parts. The first part is the vertical velocity of the missile, and the second part is the vertical height of the missile.

U.S. Pat. No. 6,845,938 disclosed an apparatus of periodically guiding targets. The apparatus constructs a re-constructed line-of-sight (LOS) and uses harmonically balanced Kalman filter banks to construct a set of guidance command signals. The signal set is perpendicular to the LOS of the target, and the signal is used to an automatic navigator.

U.S. Pat. No. 7,034,742 disclosed an application of two Kalman filters. The first Kalman filter can predict the vehicle state from the yaw rate and speed of the moving vehicle, and the second Kalman filter obtains the road curvature parameters. The system is applicable to warning system, safety system and vehicle control system.

U.S. Pat. No. 7,046,188 disclosed a system and method of tracking target. In the embodiment of the disclosed patent, when a target is detected, the Kalman filter is used for tracking. After losing the detection, a blind zone particle filter can be used until the probability that the target is located in the blind zone exceeds a threshold. When the probability that the target is in the unrestricted zone is higher than the threshold, the blind zone particle filter and the unrestricted zone particle filter can compute simultaneously. Then, the system can resume the Kalman filter for tracking.

SUMMARY OF THE INVENTION

The defense system against the air-to-surface missiles (ASM), such as Patriots missile defense system, relies on the prediction accuracy and fast response for the effectiveness. However, if the trajectory prediction for the target missile has a large error, such as the aforementioned extended Kalman filer, or requires long computation time, such as the aforementioned two-stage linear Kalman filter, the target missile cannot be effectively intercepted. Although the prior arts provide certain improvement, each disclosed prior reference also has its own disadvantages.

The primary object of the present invention is to provide a prediction method for missile so that a target missile trajectory can be accurately estimated and predicted in the minimum time for the effective interception of the missile.

Yet another object of the present invention is to provide a system for predicting a target missile. Through a plurality of sensors deployed at various locations to sense the echoed wave signals of a target missile and a computing and processing system connected to each sensor, a location of the target missile can be estimated and predicted according to the pre-configured algorithm.

The techniques used by the present invention to solve the conventional problems are to deploy plural sensors at various locations for receiving echoed wave signals from the target missile, use the hybrid FSK/LFM unit to receive the signals and compute the relative distance and relative velocity of the target missile, use the two-stage Kalman filter to filter the computed relative distance and relative velocity to obtain the relative distance, relative velocity and relative acceleration of the target missile, and finally trilaterate by using the relative distance, relative velocity and relative acceleration of the target missile from each two-stage Kalman filter to obtain the components of location, velocity and acceleration along x, y, and z directions. The trilaertation module can further connect to plural one-stage Kalman filters to receive the location, velocity, and acceleration along each direction computed by the trilateration module to speed up the convergence.

The system and method of the present invention using FSK/LFM hybrid signal, two-stage Kalman filters, trilateration can effectively defend against the noise and accurately predict the location of the target missile to be intercepted. The system also has the advantage of fast prediction. If the system further deploys one-stage linear Kalman filters to respectively receive the location, velocity, and acceleration along each direction computed by the trilateration module, the convergence can be speeded up.

The method of the present invention uses the FSK/LFM hybrid signal. With only two samples, the method of the present invention can compute the relative distance and relative velocity. The computation time is greatly reduced in comparison with the prior arts.

The preferred embodiment of the present invention uses the combination of two-stage and one-stage Kalman filters to estimate the x, y, z, $v_x$, $v_y$, $v_z$, $a_x$, $a_y$, and $a_z$ of the target and improves the positioning accuracy. The error in acceleration estimation is only about $\frac{1}{10}$ of the conventional extended Kalman filters. The present invention can estimate the location, velocity and acceleration along each of the x, y and z directions of the target in a short time to allow the fast prediction of the target location at the next time instant.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE INVENTION

Figure 1:
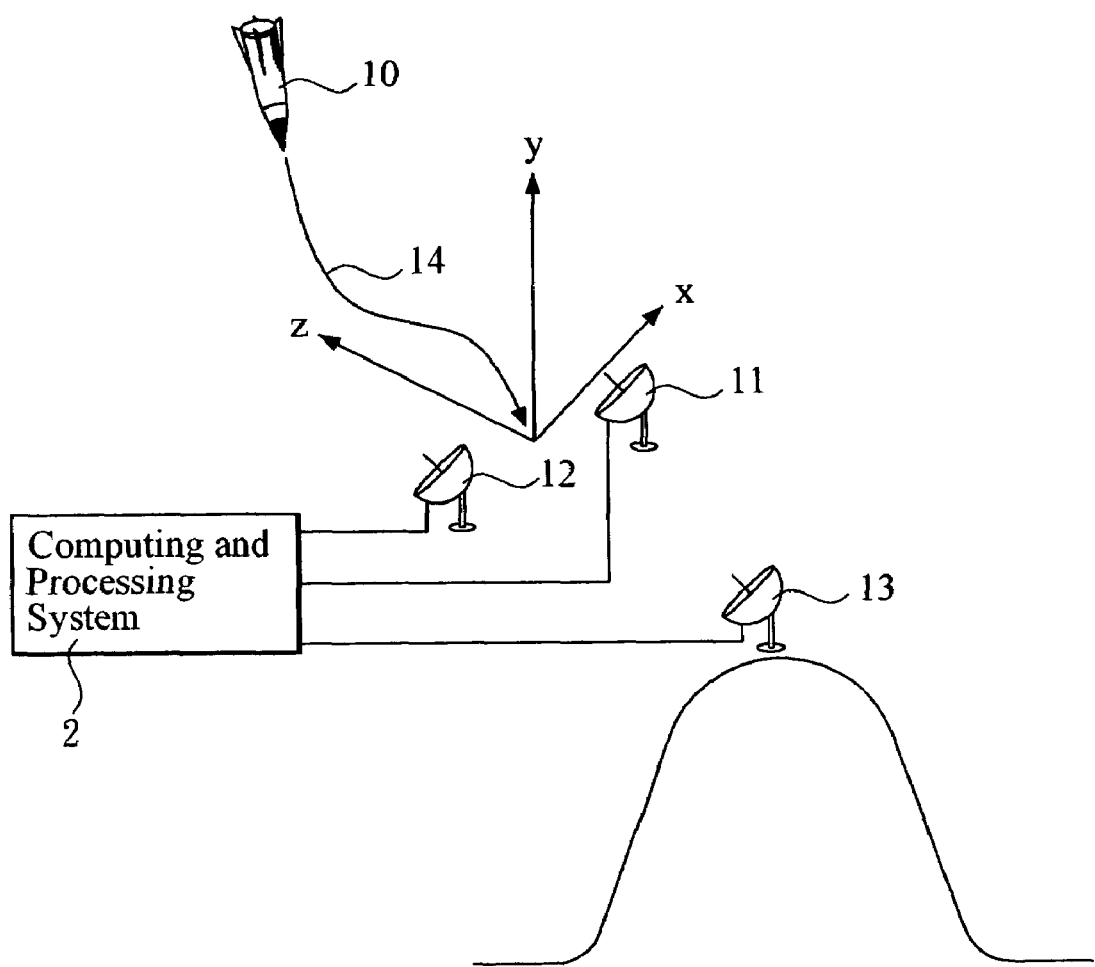
FIG. 1 shows a schematic view of a scenario in which a target missile attacking the field deployed with three sensors.

With reference to the drawings and in particular to FIG. 1, which shows a schematic view of a scenario in which a target missile attacking a field deployed with three sensors, the target missile 10 is a missile fired by the enemy and is thus the target for interception by a missile defense system.

A first sensor 11, a second sensor 12, and a third sensor 13 are the devices, such as radar, for transmitting the detection signal and receiving the signal echoed from the target missile 10. The sensors 11, 12, 13 cover the field that is under attack by the target missile 10. The echo signals received by the sensors 11, 12, 13 are fed to a computing and processing system 2. Based on a pre-set algorithm, the computing and processing system 2 uses the echo signals to predict, i.e., compute, a trajectory 14 of the target missile 10.

Assume the target missile 10 moves with a fixed acceleration:

$$a_{tx}(t) = a_{tx}(0);$$

$$a_{ty}(t) = a_{ty}(0); \text{ and}$$

$$a_{tz}(t) = a_{tz}(0),$$

where $a_{tx}(0)$, $a_{ty}(0)$ and $a_{tz}(0)$ are initial acceleration. The integral of the initial acceleration is the velocity of the target missile 10.

$$v_{tx}(t) = \int_0^t a_{tx}(\tau) d\tau$$
$$= v_{tx}(0) + a_{tx}(0)t$$

$$v_{ty}(t) = \int_0^t a_{ty}(\tau) d\tau$$
$$= v_{ty}(0) + a_{ty}(0)t$$

$$v_{tz}(t) = \int_0^t a_{tz}(\tau) d\tau$$
$$= v_{tz}(0) + a_{tz}(0)t$$

where $v_{tx}(0)$, $v_{ty}(0)$ and $v_{tz}(0)$ are the initial velocity. The integral of the velocity is the trajectory of the target missile 10

$$x_t(t) = \int_0^t v_{tx}(\tau) d\tau$$
$$= x_t(0) + v_{tx}(0)t + \frac{1}{2}a_{tx}(0)t^2$$

$$y_t(t) = \int_0^t v_{ty}(\tau) d\tau$$
$$= y_t(0) + v_{ty}(0)t + \frac{1}{2}a_{ty}(0)t^2$$

$$z_t(t) = \int_0^t v_{tz}(\tau) d\tau$$
$$= z_{tz}(0) + v_{tz}(0) + = t + \frac{1}{2}a_{tz}(0)t^2$$

where $x_t(0)$, $y_t(0)$ and $z_t(0)$ are the initial coordinates.

In general, a missile can reach a maximum velocity of 1,360 m/s and a maximum g-load of 40 g. Assume that the target missile is initially located at $x_t(0)=0$ m, $y_t(0)=6,000$ m, and $z_t(0)=8,000$ m, moving with $v_{tx}(0)=0$ m/s, $v_{ty}(0)=0$ m/s, $v_{tz}(0)=-200$ m/s, $a_{tx}(0)=0$ m/s², $a_{ty}(0)=-200$ m/s², and $a_{tz}(0)=-300$ m/s².

A sensor can measure the radial distance and velocity as $$r_i(t) = \sqrt{[x_t(t) - x_i]^2 + [y_t(t) - y_i]^2 + [z_t(t) - z_i]^2}$$

$$v_i(t) = \frac{x_t(t) - x_i}{r_i(t)} v_{tx}(t) + \frac{y_t(t) - y_i}{r_i(t)} v_{ty}(t) + \frac{z_t(t) - z_i}{r_i(t)} v_{tz}(t)$$

where the subscript i refers to the i-th sensor.

Figure 2:
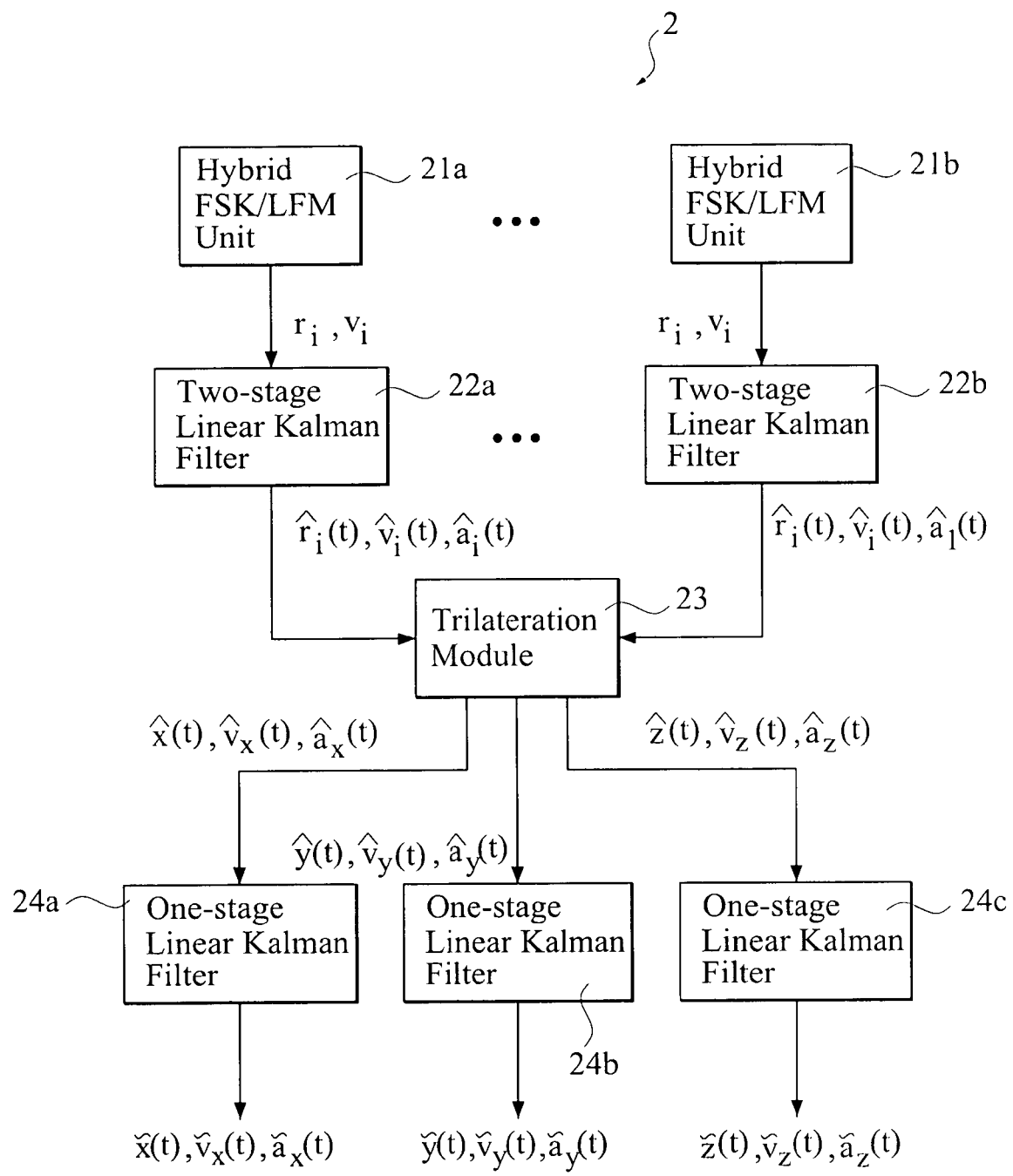
FIG. 2 shows a schematic view of a preferred embodiment of a computing and processing system of FIG. 1, including the combination of two-stage and one-stage Kalman filters to estimate the kinetic parameters, such as location, velocity and acceleration of the target.

FIG. 2 shows a schematic view of a preferred embodiment of a computing and processing system 2 of FIG. 1, including the combination of two-stage and one-stage Kalman filters to estimate the kinetic parameters, such as location, velocity and acceleration of the target.

The computing and processing system 2 includes a plurality of hybrid FSK/LFM units 21a, 21b for receiving the frequency-shift keying (FSK) and linear frequency modulation (LFM) hybrid signals echoed by the target missile 10 to obtain the distance $r_i$ and the radial velocity $v_i$ of target missile 10. The hybrid FSK/LFM units 21a, 21b are connected respectively to two-stage Kalman filters 22a, 22b for estimating $\hat{r}_i(t)$, $\hat{v}_i(t)$ and $\hat{a}_i(t)$.

The $\hat{r}_i(t)$, $\hat{v}_i(t)$ and $\hat{a}_i(t)$ generated by the two-stage Kalman filters 22a, 22b are transmitted to a trilateration module 23 to compute and determine $\hat{x}(t)$, $\hat{y}(t)$, $\hat{z}(t)$, $\hat{v}_x(t)$, $\hat{v}_y(t)$, $\hat{v}_z(t)$, $\hat{a}_x(t)$, $\hat{a}_y(t)$ and $\hat{a}_z(t)$.

The output of the trilateration module 23 is connected respectively to three one-stage linear Kalman filters 24a, 24b, 24c. The $\hat{x}(t)$, $\hat{v}_x(t)$, $\hat{a}_x(t)$ signals generated by the trilateration module 23 are sent to the one-stage Kalman filter 24a to generate $\tilde{x}(t)$, $\tilde{v}_x(t)$, $\tilde{a}_x(t)$. The $\hat{y}(t)$, $\hat{v}_y(t)$, $\hat{a}_y(t)$ signals generated by the trilateration module 23 are sent to the one-stage Kalman filter 24b to generate $\tilde{y}(t)$, $\tilde{v}_y(t)$, $\tilde{a}_y(t)$. The $\hat{z}(t)$, $\hat{v}_z(t)$, $\hat{a}_z(t)$ signals generated by the trilateration module 23 are sent to the one-stage Kalman filter 24c to generate $\tilde{z}(t)$, $\tilde{v}_z(t)$, $\tilde{a}_z(t)$.

Figure 3:
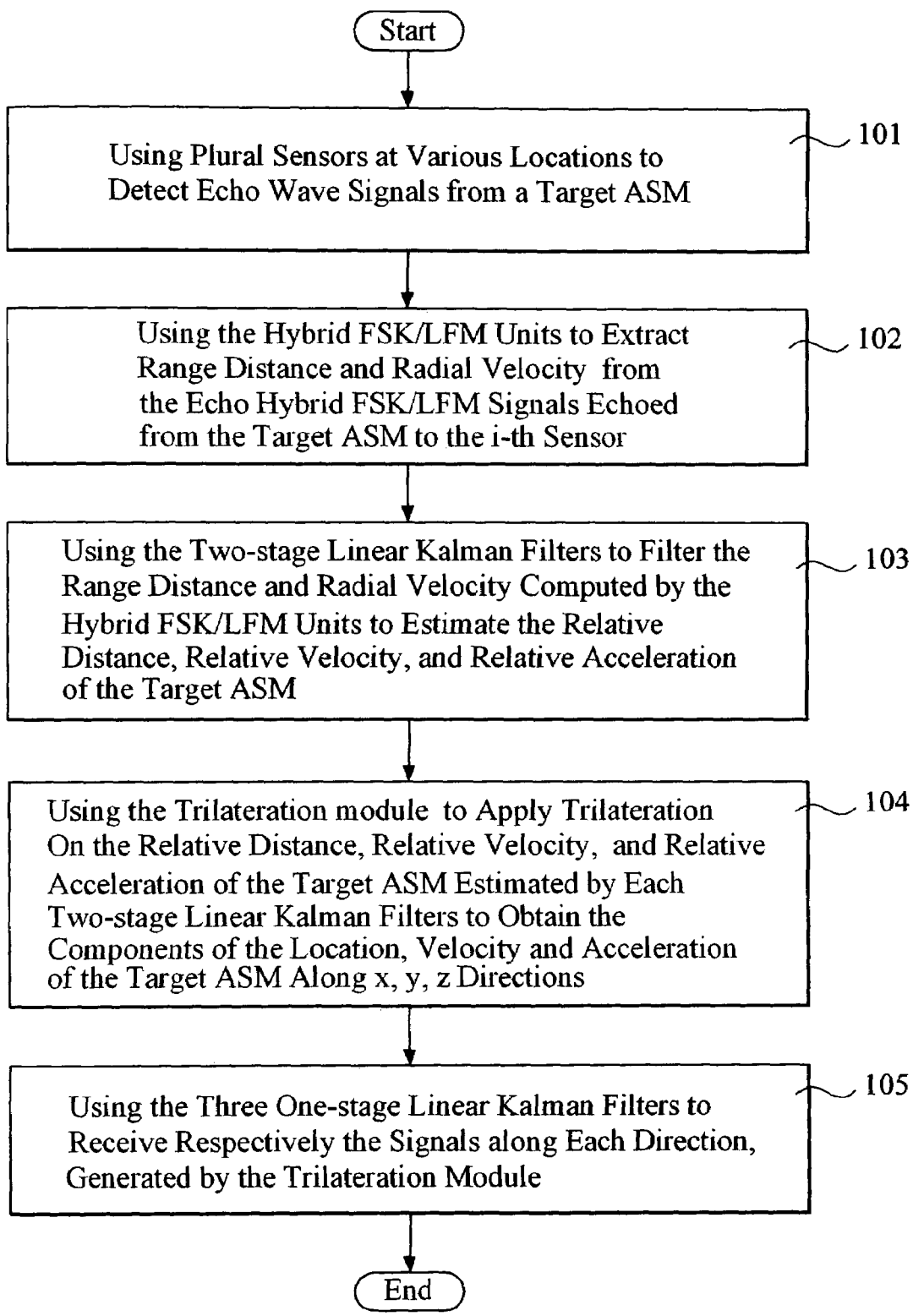
FIG. 3 shows a flowchart of the method for predicting a trajectory of an air-to-surface missile of the present invention.

FIG. 3 shows a flowchart of the method for predicting a trajectory of an air-to-surface missile of the present invention. The execution of the method of the present invention includes the use of a pluralilty of sensors deployed at various locations to detect the echoed wave signals from the target missile, as step 101, and followed by the following steps:

(a) step 102: using the hybrid FSK/LFM units 21a, 21b to extract a range distance $r_i$ and a radial velocity $v_i$ from the echo hybrid FSK/LFM signal echoed from the target missile to the i-th sensor;

(b) step 103: using the two-stage linear Kalman filters 22a, 22b to filter the range distance $r_i$ and radial velocity $v_i$ computed by the hybrid FSK/LFM units 21a, 21b to estimate the relative distance $\hat{r}_i$, relative velocity $\hat{v}_i$, and relative acceleration $\hat{a}_i$ of the target missile;

(c) step 104: using the trilateration module 23 to apply trilateration on the relative distance $\hat{r}_i$, relative velocity $\hat{v}_i$, and relative acceleration $\hat{a}_i$ of the target missile estimated by each of the two-stage linear Kalman filters 22a, 22b to obtain the components of the location, velocity and acceleration of the target missile along the x, y, z directions, i.e., $\hat{x}(t)$, $\hat{y}(t)$, $\hat{z}(t)$, $\hat{v}_x(t)$, $\hat{v}_y(t)$, $\hat{v}_z(t)$, $\hat{a}_x(t)$, $\hat{a}_y(t)$ and $\hat{a}_z(t)$; and (d) step 105: using the three one-stage linear Kalman filters 24a, 24b, 24c to receive respectively the signals along each direction, i.e., $\hat{x}(t)$, $\hat{y}(t)$, $\hat{z}(t)$, $\hat{v}_x(t)$, $\hat{v}_y(t)$, $\hat{v}_z(t)$, $\hat{a}_x(t)$, $\hat{a}_y(t)$ and $\hat{a}_z(t)$, generated by the trilateration module 23.

The computing and processing steps are further described as follows.

(1) Hyrbid FSK and LFM

Figure 4:
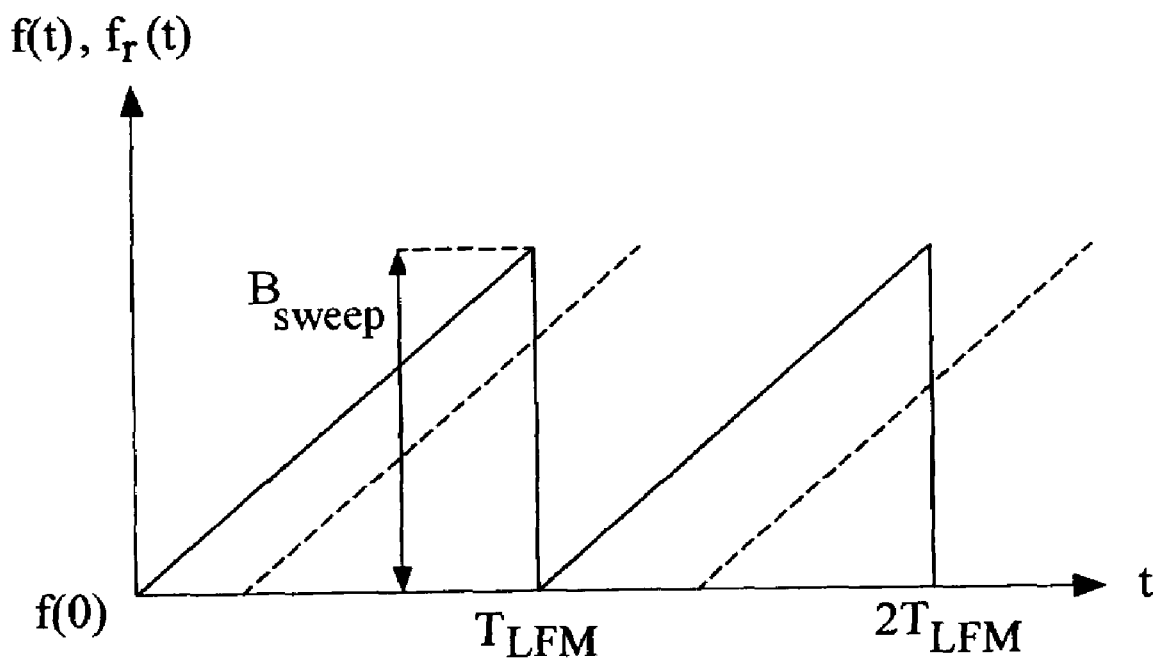
FIG. 4 shows a schematic view of a frequency variation of two LFM signals.

FIG. 4 shows a schematic view of the frequency variation of signals of linear frequency modulation (LFM), where along the x-axis $T_{LFM}$ is the period, along the y-axis $f(t)$, $f_r(t)$ are the frequency, and $B_{sweep}$ is the bandwidth.

Figure 4A:
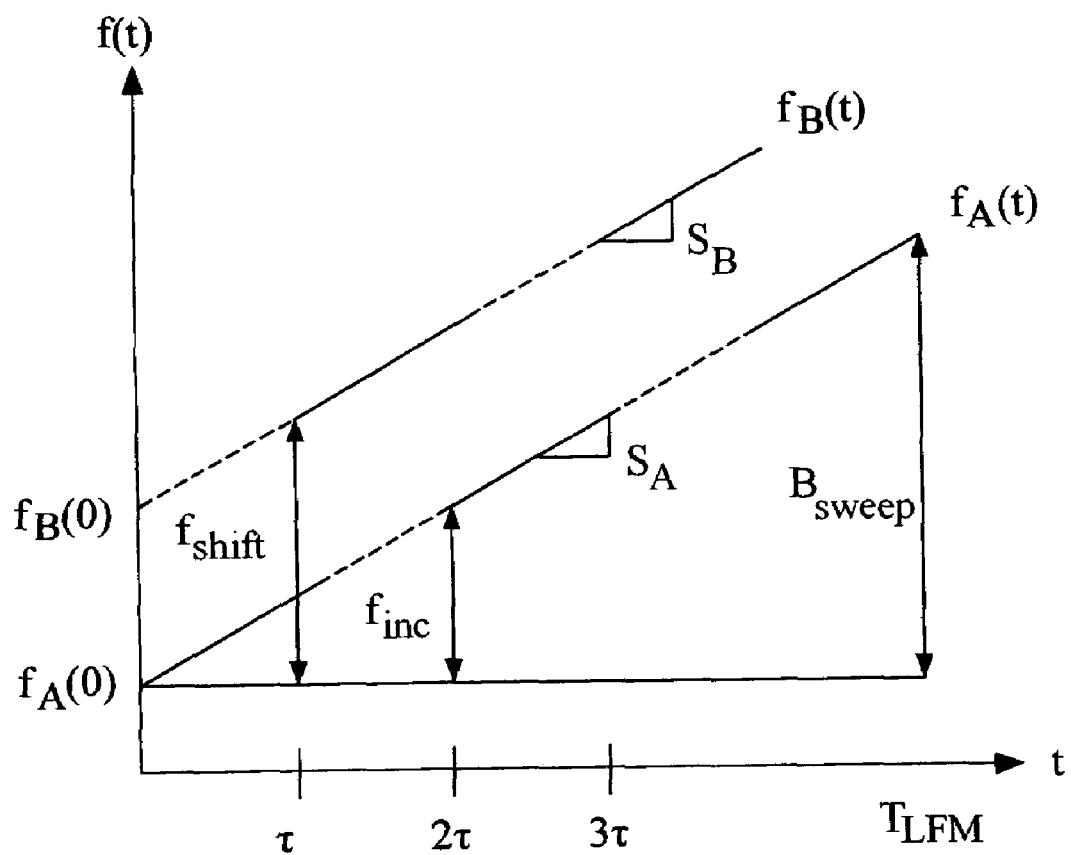
FIG. 4A shows a schematic view of a frequency variation of FSK/LFM hybrid signals.
Figure 5A:
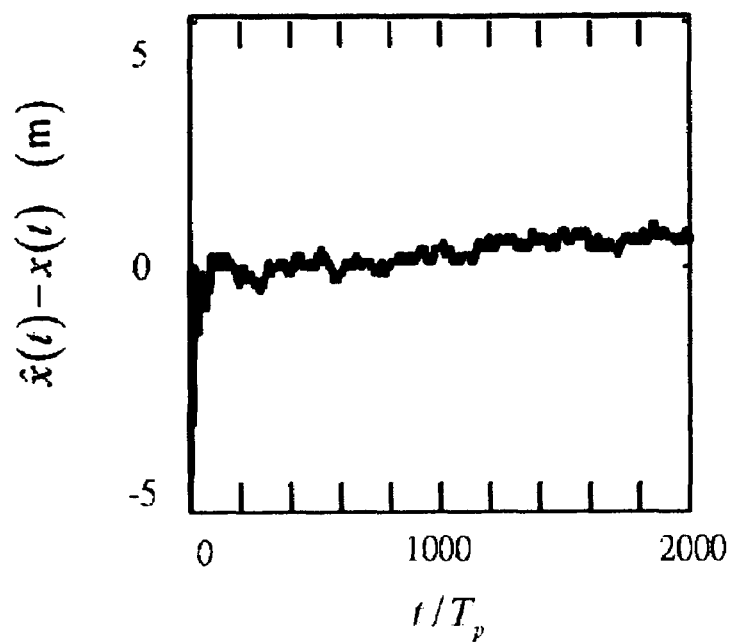
FIGS. 5A-5I show the prediction errors of a simulation trial after steps 101-104 of FIG. 3.
Figure 5B:
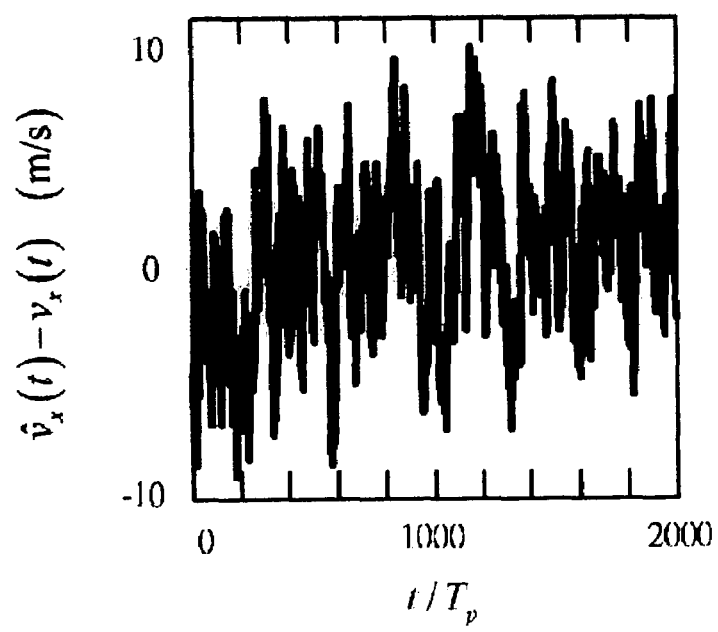
Figure 5C:
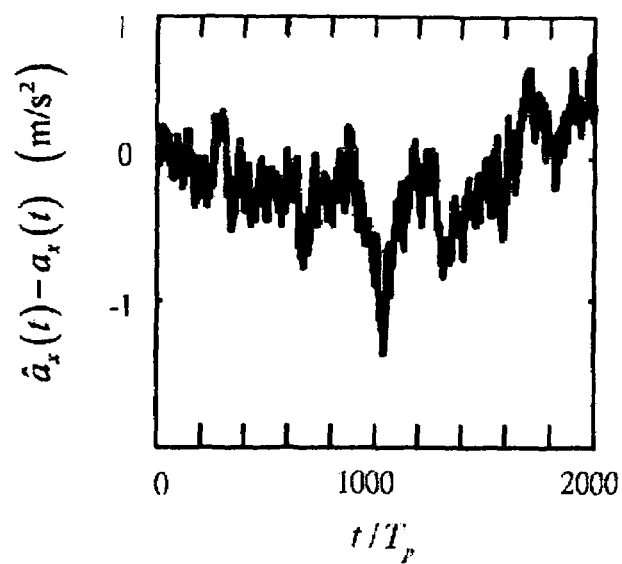
Figure 5D:
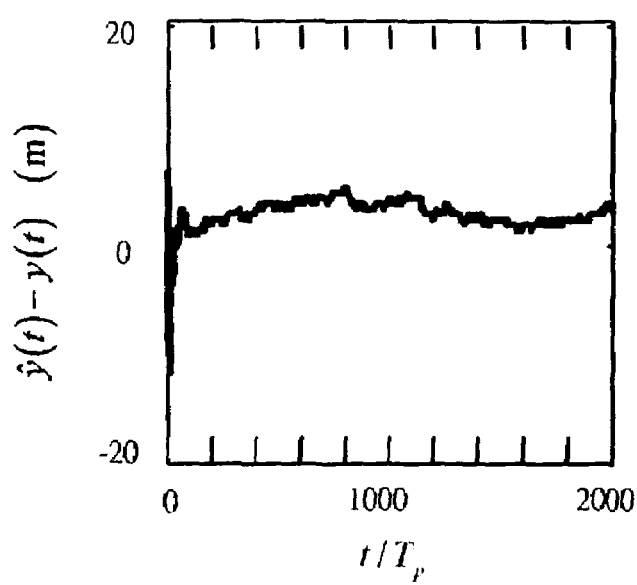
Figure 5E:
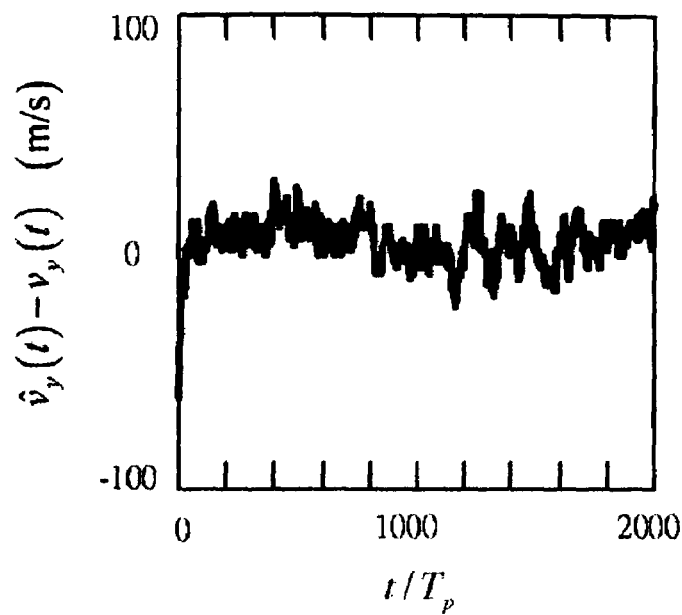
Figure 5F:
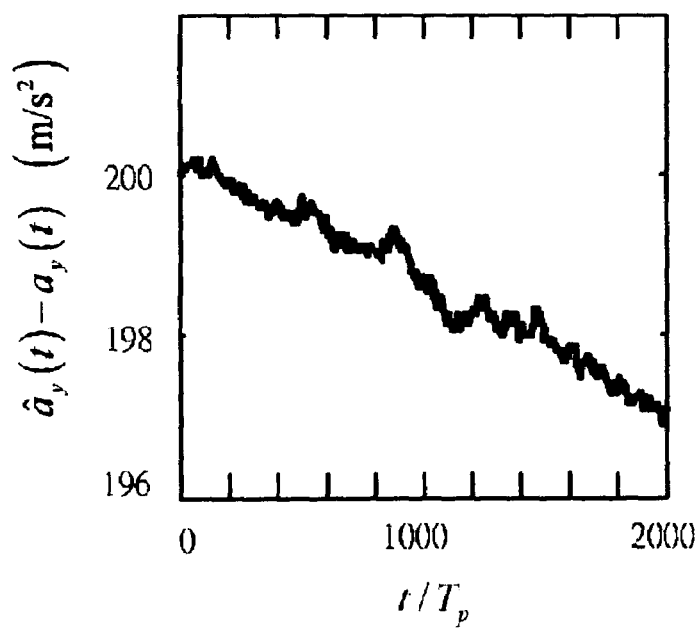
Figure 5G:
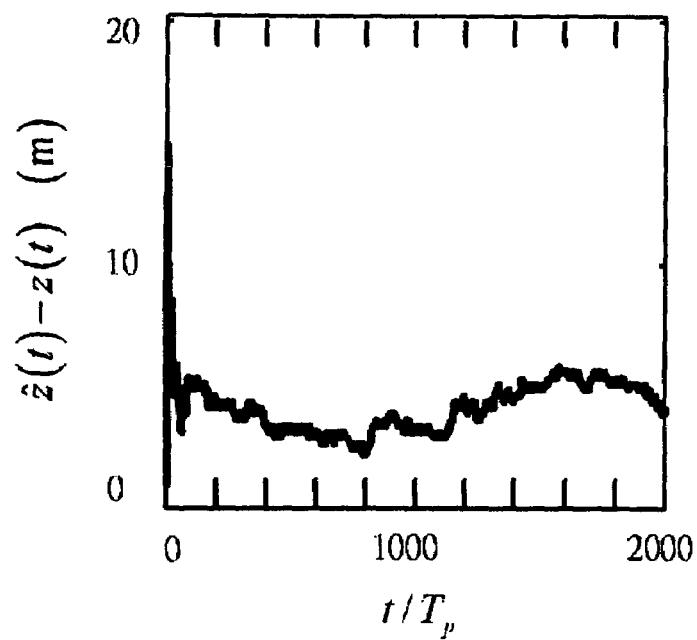
Figure 5H:
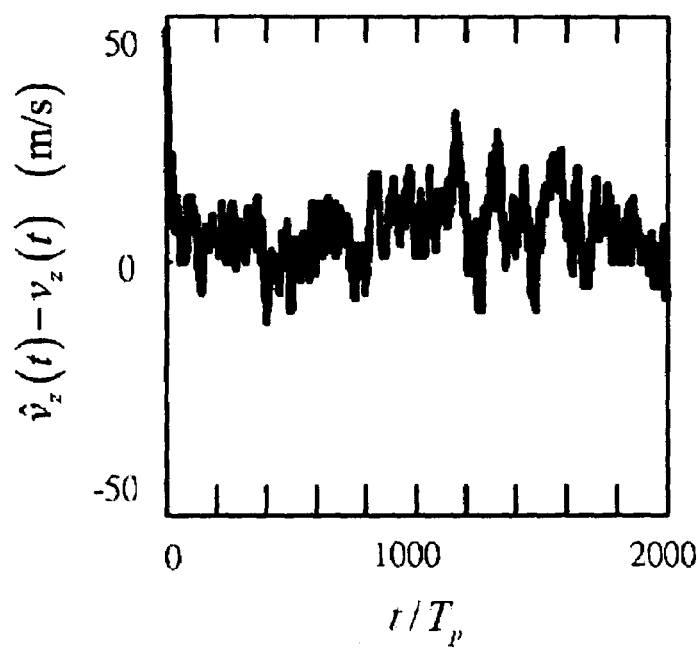
Figure 5I:
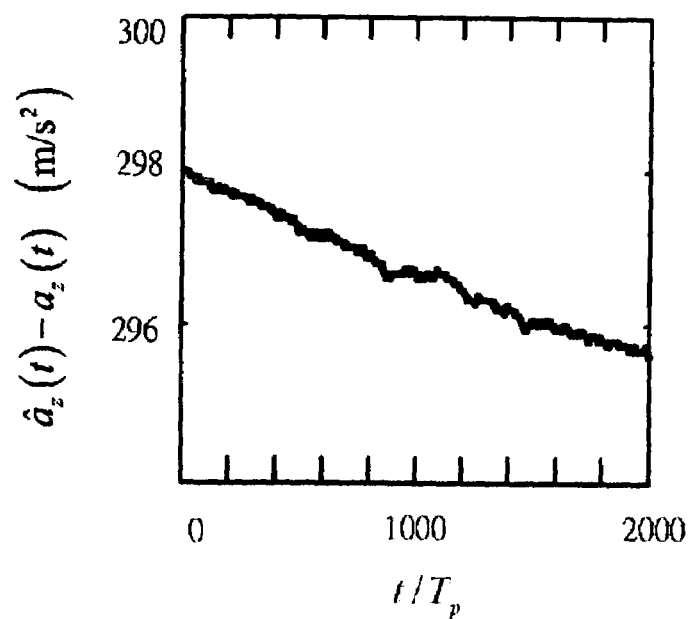
Figure 6A:
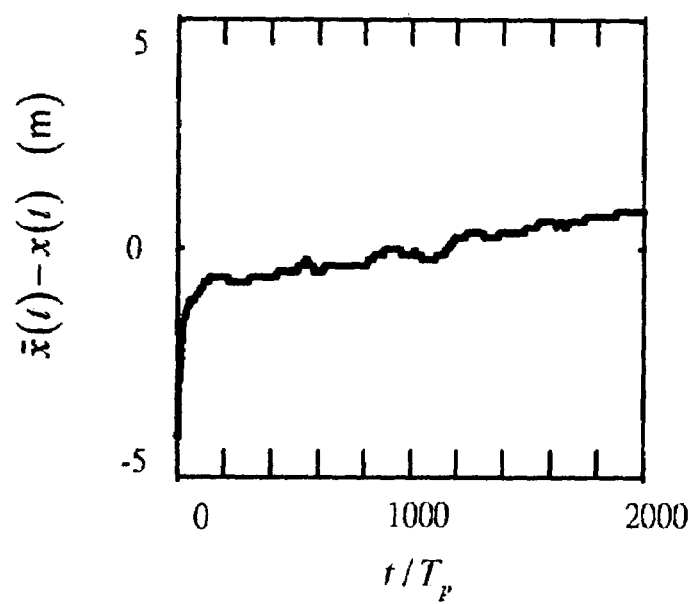
FIGS. 6A-6I show the prediction errors of a simulation trial after steps 101-105 of FIG. 3.
Figure 6B:
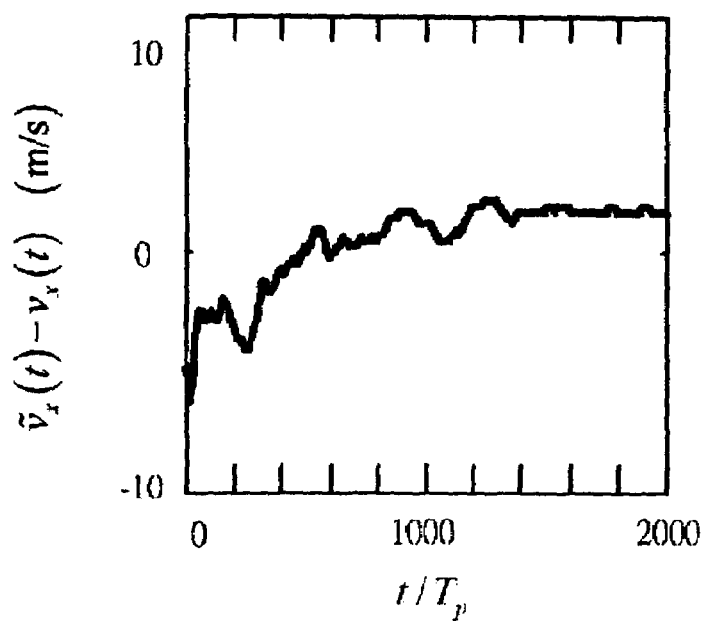
Figure 6C:
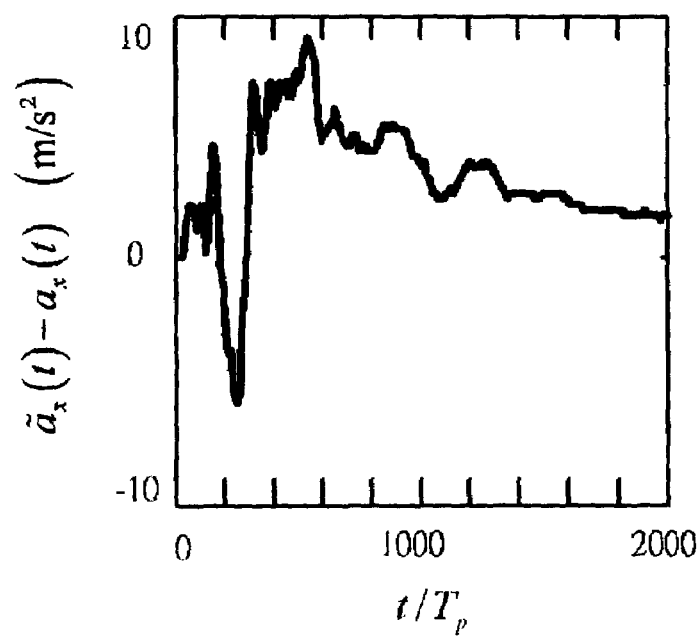
Figure 6D:
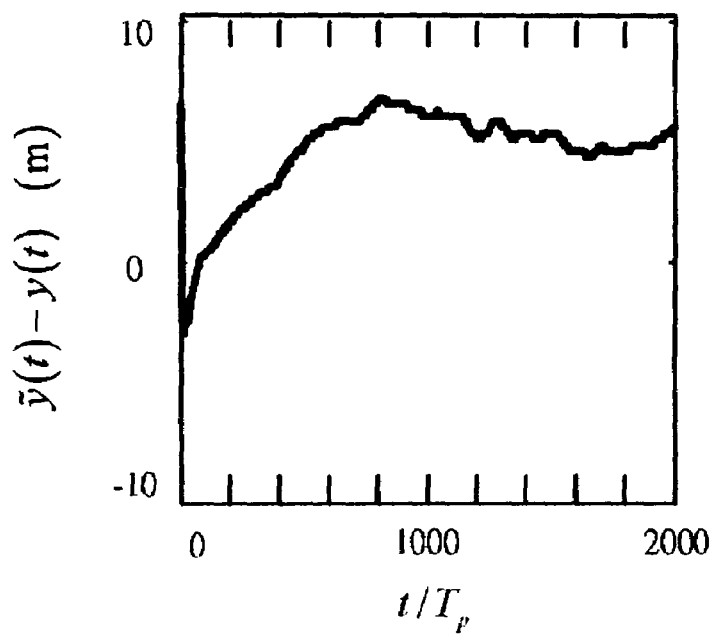
Figure 6E:
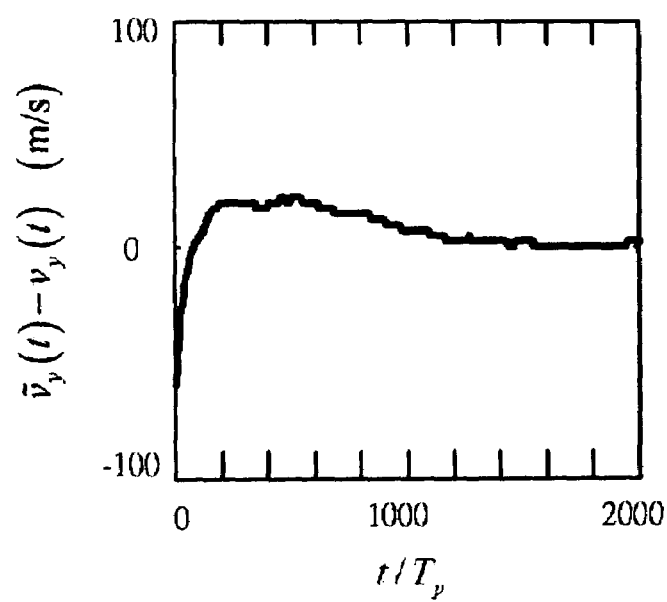
Figure 6F:
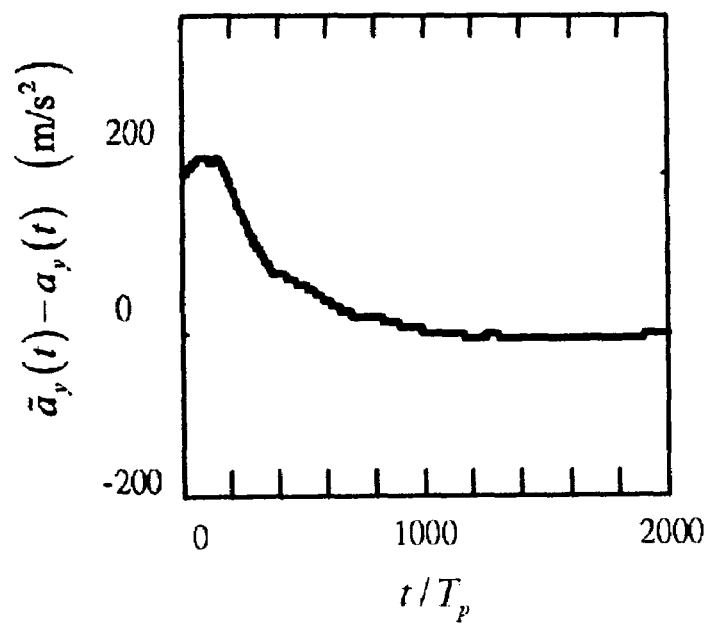
Figure 6G:
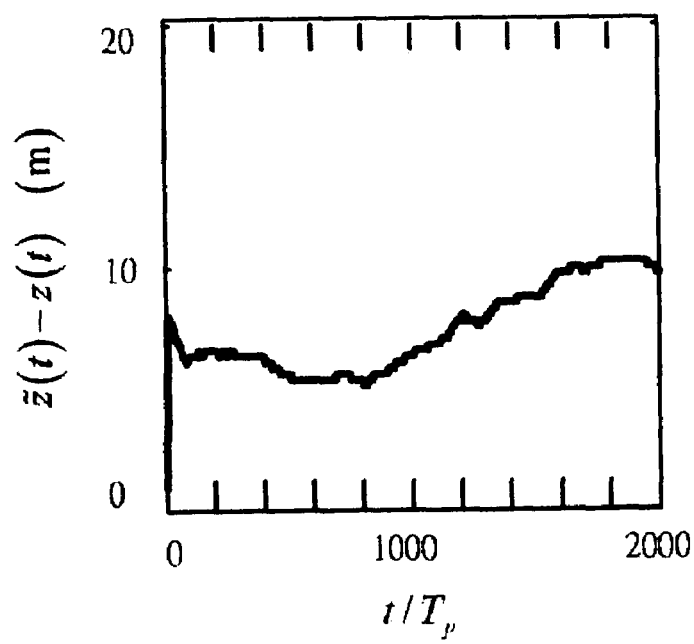
Figure 6H:
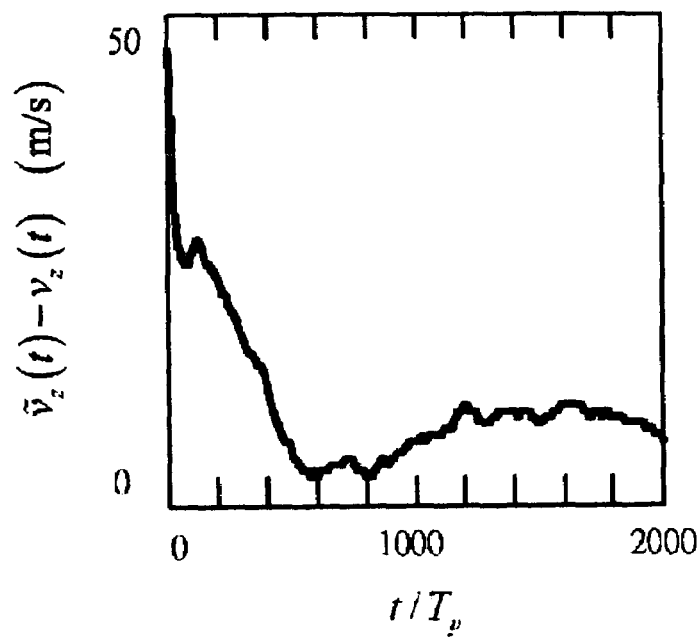
Figure 6I:
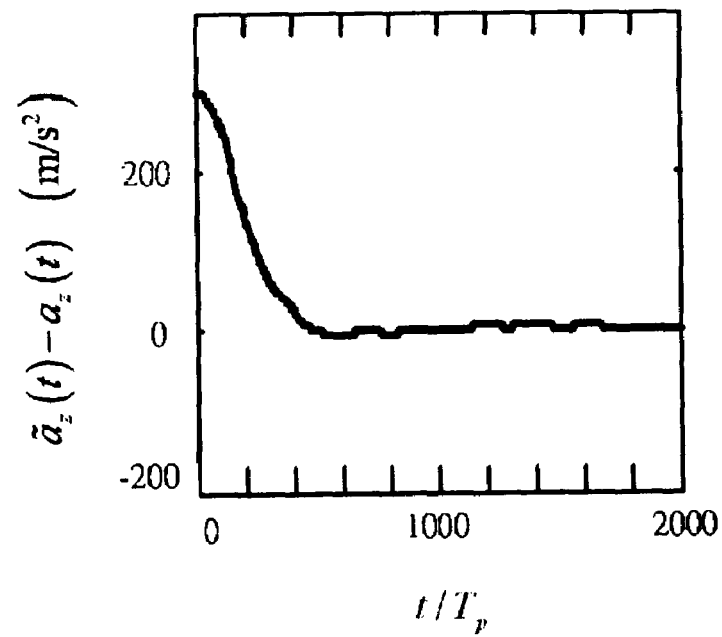

FIG. 4A shows a schematic view of frequency variation of FSK/LFM hybrid signals, where the frequency variations of two LFM signals have positive slopes $S_A$ and $S_B$, respectively. To simplify the description, assume that $S_A$ and $S_B$ are both equal to S. 2N samples are taken with interval $\tau = T_{LFM}/2N$. The difference of frequency of the second signal measured at $t=2n\tau$ and that of the first signal measured at $t=(2n-1)\tau$ is $f_{shift} = f_B(0) - f_A(0) + S\tau$. The frequency increment over $2\tau$ is $f_{inc} = B_{sweep}/N$.

The difference between the frequency of the echo signal and that of the transmitted signal is $\Delta f = f_{rA}(t) - f_A(t)$. Let $s = \Delta f T_{LFM}$, then during the $0 < t < T_{LFM}$ interval:

$$S = T_{TLFM}[f_{rA}(t) - f_A(t)] \quad (1)$$

$$= T_{LFM}\left\{\left[f_0 + s\left(t - \frac{2r_A}{c}\right)\right]\left(1 - \frac{2v_A}{c}\right) - (f_0 + st)\right\}$$

$$= T_{LFM}\left[-\frac{2v_A}{c}f_A(t) - \frac{2sr_A}{c}\left(1 - \frac{2v_A}{c}\right)\right]$$

$$\simeq T_{LFM}\left[-\frac{2s}{c}r_A - \frac{2f_A(t)}{c}v_A\right]$$

A signal target with given range distance r and velocity v renders $f_A(t) \gg f_B(t) - f_A(t)$, and thus $S = S_A \approx S_B$. Typical parameters are $B_{sweep} = 150$ MHz, $f_B(t) - f_A(t) = 300$ kHz, $T_{LFM} = 256$ ms and N=256.

The difference of phase of the second signal measured at $t=2n\tau$ and that of the first signal measured at $t=(2n-1)\tau$ is:

$$\Delta\varphi = \varphi_B - \varphi_A \quad (2)$$

$$= \frac{4\pi}{c}\left\{\begin{array}{l}\left[f_B(0) + 2ns\tau - \frac{2sr_B}{c}\right]\left(1 - \frac{2v_B}{c}\right)r_B - \\ \left[f_A(0) + (2n-1)s\tau - \frac{2sr_A}{c}\right]\left(1 - \frac{2v_A}{c}\right)r_A\end{array}\right\}$$

$$\simeq \frac{4\pi}{c}\left\{\begin{array}{l}\left[f_B(0) + 2ns\tau - \frac{2sr_B}{c}\right]r_B - \\ \left[f_A(0) + (2n-1)s\tau - \frac{2sr_A}{c}\right]r_A\end{array}\right\}$$

$$\simeq \frac{4\pi}{c}f_{shift}r_A + \frac{4\pi}{c}f_B(t)v_a\tau$$

From equations (1) and (2), the following relation can be obtained:

$$\begin{bmatrix}r\\v\end{bmatrix} = \begin{bmatrix}-2s/c & -2f_A(t)/c \\ 4\pi f_{shift}/c & 4\pi f_B(t)\tau/c\end{bmatrix}^{-1}\begin{bmatrix}S\\ \Delta\varphi\end{bmatrix} \quad (3)$$

Equations (1) and (2) can both be expressed as a line segment on the r-v plane, and the angle between the two line segments is:

$$\theta = \tan^{-1}\left(\frac{\frac{4\pi}{c}f_{shift}}{\frac{\pi}{2N\Delta v}}\right) - \tan^{-1}\left(\frac{\frac{1}{2\Delta r}}{\frac{1}{2\Delta v}}\right)$$

where $\Delta r = c/4 B_{sweep}$ is the range resolution, and $\Delta v = \lambda/4T_{LFM}$ is the velocity resolution. Choose the frequency shift $f_{shift} = -f_{inc}/2$, and the two line segments will be orthogonal to achieve the highest range and velocity accuracy.

(2) Two-Stage Kalman Filter

The steps of a two-stage Kalman filter are summarized as follows:

$$\overline{G}'_{xf}[n] = \overline{K}'_x[n\mid n-1]\cdot\overline{H}^\dagger[n]\cdot\left\{\overline{H}[n]\cdot\overline{K}'_x[n\mid n-1]\cdot\overline{H}^\dagger[n] + \overline{Q}_{x2}\right\}^{-1} \quad (4)$$

$$\overline{x}'[n\mid n] = \overline{x}'[n\mid n-1] + \overline{G}'_{xf}[n]\cdot\{\overline{y}[n] - \overline{H}[n]\cdot\overline{x}'[n\mid n-1]\} \quad (5)$$

$$\overline{K}'_{xe}[n] = \overline{K}'_x[n\mid n-1] - \overline{G}'_{xf}[n]\cdot\overline{H}[n]\cdot\overline{K}'_x[n\mid n-1] \quad (6)$$

$$\overline{x}'[n+1\mid n] = \overline{A}[n+1]\cdot\overline{x}'[n\mid n] \quad (7)$$

$$\overline{K}'_x[n+1\mid n] = \overline{A}[n+1]\cdot\overline{K}'_{xe}[n]\cdot\overline{A}^\dagger[n+1] + \overline{Q}_{x1} \quad (8)$$

where $\overline{x}'[n\mid n]$ is the filtered estimate of the state vector, $\overline{x}'[n+1\mid n]$ is the predicted estimate of the state vector, $\overline{y}[n]$ is the measurement vector, $\overline{G}'_{xf}[n]$ is the Kalman gain matrix, $\overline{K}'_{xe}[n]$ is the correlation matrix of $\overline{x}'[n\mid n]$, $\overline{K}'_x[n+1\mid n]$ is the correlation matrix of $\overline{x}'[n+1\mid n]$, $\overline{A}[n]$ is the transition matrix, $\overline{H}[n]$ is the measurement matrix, $\overline{Q}_{x1}$ is the correlation matrix of the process noise vector, and $\overline{Q}_{x2}$ is the correlation matrix of the measurement vector.

The bias estimator is summarized as follows:

$$\bar{r}[n] = \bar{y}[n] - \overline{H}[n] \cdot \bar{x}'[n \mid n-1] \tag{9}$$

$$\overline{G}'_{bf}[n] = \overline{K}'_b[n \mid n-1] \cdot \overline{S}^\dagger[n] \cdot$$
$$\left\{ \overline{H}[n] \cdot \overline{K}'_x[n \mid n-1] \cdot \overline{H}^\dagger[n] + \overline{S}[n] \cdot \overline{K}_b[n \mid n-1] + \overline{S}^\dagger[n] + \overline{Q}_{x2} \right\}^{-1}$$

$$\hat{b}[n \mid n] = \hat{b}[n \mid n-1] + \overline{G}_{bf}[n] \cdot \left\{ \bar{r}[n] - \overline{S}[n] \cdot \hat{b}[n \mid n-1] \right\} \tag{10}$$

$$\overline{K}_{b\varepsilon}[n] = \overline{K}_b[n \mid n-1] - \overline{G}_{bf}[n] \cdot \overline{S}[n] \cdot \overline{K}_b[n \mid n-1] \tag{11}$$

$$\hat{b}[n \mid n-1] = \hat{b}[n-1 \mid n-1] \tag{12}$$

$$\overline{K}_b[n \mid n-1] = \overline{K}_{b\varepsilon}[n-1] \tag{13}$$

where $\bar{r}[n]$ is the measurement residual of the bias-free estimator, $\hat{b}[n|n]$ is the filtered estimate of the bias state vector, $\hat{b}[n|n-1]$ is the predicted estimate of the bias state vector, $\overline{G}_{bf}[n]$ is the Kalman gain matrix of the bias estimator, $\overline{K}_{b\varepsilon}[n]$ is the correlation matrix of $\hat{b}[n|n]$, $\overline{K}_b[n|n-1]$ is the correlation matrix of $\hat{b}[n|n-1]$, and $\overline{S}[n]$ is the sensitivity matrix. $\overline{S}[n]$ can be derived as:

$$\overline{U}[n] = \overline{A}[n] \cdot \overline{V}[n-1] + \overline{B}[n] \tag{14}$$

$$\overline{V}[n] = \overline{U}[n] - \overline{G}'_{xf}[n] \cdot \overline{S}[n] \tag{15}$$

$$\overline{S}[n] = \overline{H}[n] \cdot \overline{U}[n] + \overline{D}[n] \tag{16}$$

where $\overline{B}[n]$ is the bias transition matrix, and $\overline{D}[n]$ is the bias measurement matrix.

In this two-stage Kalman filter, the measurement vector $\bar{y}_i[n]$ and the dynamic state vector $\bar{x}_i[n]$ associated with the i-th sensor are defined respectively as $$\bar{y}_i[n] = \begin{bmatrix} r_i[n] \\ v_i[n] \end{bmatrix},$$

$$\bar{x}_i[n] = \begin{bmatrix} \hat{r}_i[n] \\ \hat{v}_i[n] \end{bmatrix}$$

and the bias vector is defined as $\bar{b}_i[n] = [\hat{a}_i[n]]$

Thus, the state transition matrix $\overline{A}_i[n]$ and the bias transition matrix $\overline{B}_i[n]$ can be derived respectively as $$\overline{A}_i[n] = \begin{bmatrix} 1 & T_p \\ 0 & 1 \end{bmatrix},$$

$$\overline{B}_i[n] = \begin{bmatrix} T_p^2/2 \\ T_p \end{bmatrix}$$

The measurement matrix $\overline{H}_i[n]$ is equal to an identity matrix of rank 2, and the bias measurement matrix is $\overline{D}_i[n] = \overline{0}$.

The correlation matrix of the process noise vector can be expressed as $$\overline{Q}_{i1} = \overline{L}_i \cdot \overline{Q}_{ia} \cdot \overline{L}_i^\dagger$$

where $$\overline{L}_i = \begin{bmatrix} T_p^2/2 \\ T_p \end{bmatrix},$$

$$\overline{Q}_{ia} = E\{a^2\}$$

The inputs to this two-stage Kalman filter are the measurement data of $r_i$ and $v_i$. Since no information on $a_i$ is available, the maximum acceleration of the missile, 40 g, is taken as the standard deviation, thus $E\{a^2\} = 160,000 \text{ m}^2/\text{s}^4$.

The correlation matrix of the measurement noise vector can be expressed as:

$$\overline{Q}_{i2} = \begin{bmatrix} \sigma_r^2 & 0 \\ 0 & \sigma_v^2 \end{bmatrix}$$

Note that the first subscript in $\overline{Q}_{\alpha\beta}$ indicates the α-th sensor. The standard deviation of range measurement is assumed $\sigma_r = 1$ m, and the standard deviation of velocity measurement is assumed $\sigma_v = 3.35$ m/s.

The initial values are $\bar{x}_i'[1|0] = [r_i[0] \ v_i[0]]^t$, $\overline{K}_{i,x}'[1|0] = \overline{I}_{2\times 2}$, $\bar{b}_i'[1|0] = [0]^t$, $\overline{K}_{i,b}'[1|0] = \overline{I}_{1\times 1}$ and $\overline{V}_i[0] = \overline{L}_i$.

(3) Trilateration

Assume the i-th sensor is located at $(x_i, y_i, z_i)$, and the reflecting point of the target is located at $(\hat{x}, \hat{y}, \hat{z})$, moving with velocity $(\hat{v}_x, \hat{v}_y, \hat{v}_z)$. The outputs form the first two-stage Kalman filter are $\hat{r}_i$, $\hat{v}_i$ and $\hat{a}_i$.

The radial ranges $\hat{r}_1$, $\hat{r}_2$ and $\hat{r}_3$ from the three sensors to the target are $$\hat{r}_1^2 = (\hat{x} - x_1)^2 + \hat{y}^2 + \hat{z}^2 \tag{17}$$

$$\hat{r}_2^2 = (\hat{x} - x_2)^2 + \hat{y}^2 + \hat{z}^2 \tag{18}$$

$$\hat{r}_3^2 = \hat{x}^2 + (\hat{y} - y_3)^2 + (\hat{z} - z_3)_2 \tag{19}$$

Note that $y_1 = z_1 = y_2 = z_2 = x_3 = 0$. Eliminating $\hat{y}$ and $\hat{z}$ from equations (17) and (18) results in $$\hat{r}_1^2 - (\hat{x} - x_1)^2 = r_2^2 - (\hat{x} - x_2)^2 \tag{20}$$

$$x = \frac{x_1^2 - x_2^2 - \hat{r}_1^2 + \hat{r}_2^2}{2(x_1 - x_2)}$$

From equations (18) and (19), $\hat{y}$ can be determined as $$\hat{y} = \frac{-p_2 + \sqrt{p_2^2 - 4p_1 p_3}}{2p_1} \tag{21}$$

where $$p_1 = 1 + \frac{y_3^2}{z_3^2},$$

-continued $$p_2 = -2p_4 \frac{y_3}{z_3}$$

$$p_3 = p_4^2 - \hat{r}_2^2 + (\hat{x} - x_2)^2$$

$$p_4 = \frac{\hat{r}_2^2 - (\hat{x} - x_2)^2 - \hat{r}_3^2 + \hat{x}^2 + y_3^2 + z_3^2}{2z_3}$$

Then, $\hat{z}$ can be determined as $$\hat{z} = p_4 - \frac{y_3}{z_3}\hat{y} \qquad (22)$$

The radial velocity $\hat{v}_1$, $\hat{v}_2$ and $\hat{v}_3$ are related to $\hat{v}_x$, $\hat{v}_y$ and $\hat{v}_z$ as $$\hat{v}_1 = \frac{\hat{x} - x_1}{\hat{r}_1}\hat{v}_x + \frac{\hat{y}}{\hat{r}_1}\hat{v}_y + \frac{\hat{z}}{\hat{r}_1}\hat{v}_z$$

$$\hat{v}_2 = \frac{\hat{x} - x_2}{\hat{r}_2}\hat{v}_x + \frac{\hat{y}}{\hat{r}_2}\hat{v}_y + \frac{\hat{z}}{\hat{r}_2}\hat{v}_z$$

$$\hat{v}_3 = \frac{\hat{x}}{\hat{r}_3}\hat{v}_x + \frac{\hat{y} - y_3}{\hat{r}_3}\hat{v}_y + \frac{\hat{z} - z_3}{\hat{r}_3}\hat{v}_z$$

or in the matrix form $$\begin{bmatrix} \hat{v}_x \\ \hat{v}_y \\ \hat{v}_z \end{bmatrix} = \overline{L}^{-1} \cdot \begin{bmatrix} \hat{v}_1 \hat{r}_1 \\ \hat{v}_2 \hat{r}_2 \\ \hat{v}_3 \hat{r}_3 \end{bmatrix} \qquad (23)$$

where $$\overline{L} = \begin{bmatrix} \hat{x} - x_1 & \hat{y} & \hat{z} \\ \hat{x} - x_2 & \hat{y} & \hat{z} \\ \hat{x} & \hat{y} - y_3 & \hat{z} - z_3 \end{bmatrix}$$

Similarly, the acceleration $\hat{a}_x$, $\hat{a}_y$ and $\hat{a}_z$ are related to $\hat{a}_1$, $\hat{a}_2$ and $\hat{a}_3$ as $$\begin{bmatrix} \hat{a}_x \\ \hat{a}_y \\ \hat{a}_z \end{bmatrix} = \overline{L}^{-1} \cdot \begin{bmatrix} \hat{a}_1 \hat{r}_1 \\ \hat{a}_2 \hat{r}_2 \\ \hat{a}_3 \hat{r}_3 \end{bmatrix} \qquad (24)$$

(4) One-Stage Kalman Filter

To speed up the convergence rate, the present invention uses another one-stage Kalman filter to speed up the estimation of the parameters. As the data processing of a linear Kalman filter in one direction is independent of the other two, the data associated with the x, y, and z components are processed separately.

The one-stage Kalman filter is summarized as follows:

$$\overline{R}_\alpha[n] = \overline{C}[n] \cdot \overline{K}[n|n-1] \cdot \overline{C}^\dagger[n] + \overline{Q}_2 \qquad (25)$$

$$\overline{G}[n] = \overline{K}[n|n-1] \cdot \overline{C}^\dagger[n] \cdot \overline{R}_\alpha^{-1}[n] \qquad (26)$$

$$\overline{\alpha}[n] = \overline{y}[n] - \overline{C}[n] \cdot \hat{x}[n|n-1] \qquad (27)$$

$$\hat{x}[n|n] = \hat{x}[n|n-1] + \overline{G}[n] \cdot \overline{\alpha}[n] \qquad (28)$$

$$\hat{x}[n+1|n] = \overline{F}[n+1|n] \cdot \hat{x}[n|n] \qquad (29)$$

$$\overline{K}_\epsilon[n] = \overline{K}[n|n-1] - \overline{G}[n] \cdot \overline{C}[n] \cdot \overline{K}[n|n-1] \qquad (30)$$

$$\overline{K}[n+1|n] = \overline{F}[n+1|n] \cdot \overline{K}_\epsilon[n] \cdot \overline{F}^\dagger[n+1|n] + \overline{Q}_1 \qquad (31)$$

where $\overline{\alpha}[n]$ is the innovation vector, $\hat{x}[n|n]$ is the filtered estimate of the state vector, $\hat{x}[n+1|n]$ is the predicted estimate of the state vector, $\hat{y}[n]$ is the measurement vector, $\overline{R}_\alpha[n]$ is the correlation matrix of $\overline{\alpha}[n]$, $\overline{G}[n]$ is the Kalman gain, $\overline{K}_\epsilon[n]$ is the correlation matrix of $\hat{x}[n|n]$, $\overline{K}[n+1|n]$ is the correlation matrix of $\hat{x}[n+1|n]$, $\overline{C}[n]$ is the measurement matrix, $\overline{F}[n+1|n]$ is the transition matrix, $\overline{Q}_1$ is the correlation matrix of the process noise vector, and $\overline{Q}_2$ is the correlation matrix of the measurement noise vector.

The measurement vector $\overline{y}_\beta[n]$ and the state vector $\overline{x}_\beta[n]$ of the one-stage Kalman filter associated with the $\beta$ component are defined as $$\overline{y}_\beta[n] = \begin{bmatrix} \hat{\beta}[n] \\ \hat{v}_\beta[n] \\ \hat{a}_\beta[n] \end{bmatrix},$$

$$\overline{x}_\beta[n] = \begin{bmatrix} \hat{\beta}[n] \\ \hat{v}_\beta[n] \\ \hat{a}_\beta[n] \end{bmatrix}$$

with $\beta$=x, y or z. The state transition matrix can be derived as $$\overline{F}_\beta[n+1|n] = \begin{bmatrix} 1 & T_p & T_p^2/2 \\ 0 & 1 & T_p \\ 0 & 0 & 1 \end{bmatrix}$$

The measurement matrix is $\overline{C}_\beta[n] = \overline{I}_{3\times 3}$. The correlation matrix of the process noise vector is $\overline{Q}_{\beta 1} = \overline{0}$. The correlation matrix of the measurement noise vector is assumed to be $$\overline{Q}_{\beta 2} = \begin{bmatrix} \sigma_\beta^2 & 0 & 0 \\ 0 & \sigma_{v_\beta}^2 & 0 \\ 0 & 0 & \sigma_{a_\beta}^2 \end{bmatrix}$$

The initial values are $\overline{x}_\beta[1|0] = [\hat{\beta}[0] \ \hat{v}_\beta[0] \ \hat{a}_\beta[0]]^t$ and $\overline{K}_\beta[1|0] = \overline{I}_{3\times 3}$.

(5) Combination of Two-Stage Kalman Filter and One-Stage Kalman Filter

FIGS. 5A-5I show the prediction errors of a simulation trial after steps 101-104. During $1,000\, T_p \leq t \leq 2,000\, T_p$ the errors of x, y, and x are within 0.8 m, 4 m and 6 m, respectively, the errors of $v_x$, $v_y$, and $v_z$ are within 10 m/s, 20 m/s and 25 m/s, respectively, and the errors of $a_x$, $a_y$, and $a_z$, are within 1.3 m/s², 199 m/s² and 297 m/s², respectively.

The standard deviations of the kinetic parameters at t=2,000 $T_p$ obtained by Monte Carlo simulation with ensemble size M=100 are $$\hat{\sigma}_x = \sqrt{\frac{1}{M}\sum_{n=1}^{M}(\hat{x}-x)^2} = 0.377 \text{ m}$$

$$\hat{\sigma}_y = \sqrt{\frac{1}{M}\sum_{n=1}^{M}(\hat{y}-y)^2} = 3.187 \text{ m}$$

$$\hat{\sigma}_z = \sqrt{\frac{1}{M}\sum_{n=1}^{M}(\hat{z}-z)^2} = 4.139 \text{ m}$$

$$\hat{\sigma}_{v_x} = \sqrt{\frac{1}{M}\sum_{n=1}^{M}(\hat{v}_x-v_x)^2} = 5.82 \text{ m/s}$$

$$\hat{\sigma}_{v_y} = \sqrt{\frac{1}{M}\sum_{n=1}^{M}(\hat{v}_y-v_y)^2} = 13.235 \text{ m/s}$$

$$\hat{\sigma}_{v_z} = \sqrt{\frac{1}{M}\sum_{n=1}^{M}(\hat{v}_z-v_z)^2} = 11.2 \text{ m/s}$$

$$\hat{\sigma}_{a_x} = \sqrt{\frac{1}{M}\sum_{n=1}^{M}(\hat{a}_x-a_x)^2} = 0.55 \text{ m/s}^2$$

$$\hat{\sigma}_{a_y} = \sqrt{\frac{1}{M}\sum_{n=1}^{M}(\hat{a}_y-a_y)^2} = 197.85 \text{ m/s}^2$$

$$\hat{\sigma}_{a_z} = \sqrt{\frac{1}{M}\sum_{n=1}^{M}(\hat{a}_z-a_z)^2} = 295.838 \text{ m/s}^2$$

Note that the prediction of acceleration takes a very long time to converge. The estimated acceleration is close to zero at $t \leq 2,000\, T_p$, if the initial values of acceleration are set to zeros.

Assume the standard deviations in the correlation matrices of the measurement noise vectors $\overline{Q}_{x2}$, $\overline{Q}_{y2}$ and $\overline{Q}_{z2}$ for the second one-stage Kalman filter are $\sigma_x=\sigma_y=\sigma_z=1$ 1 m, $\sigma_{vx}=\sigma_{vy}=\sigma_{vz}=1$ m/s and $\sigma_{ax}=\sigma_{ay}=\sigma_{az}=40\,0$ m/s². The choice of parameters in the correlation matrices of the measurement noise vector turn out not to affect the simulation results obviously.

The one-stage Kalman filter in step 104 tends to decrease the convergence time in estimating the accelerations. FIGS. 6A-6I show the prediction errors using this one-stage Kalman filter. During $1,000\, T_p \leq t \leq 2,000\, T_p$, the errors of x, y, and x are within 1 m, 6 m and 10 m, respectively, the errors of $v_x$, $v_y$, and $v_z$ are within 2.2 m/s, 9 m/s and 10 m/s, respectively, and the errors of $a_x$, $a_y$, and $a_z$, are within 4 m/s², 5 m/s² and 7 m/s², respectively.

The standard deviations of parameters at t=2,000 $T_p$ obtained with ensemble size M=100 are $$\overline{\sigma}_x = \sqrt{\frac{1}{M}\sum_{n=1}^{M}(\overline{x}-x)^2} = 0.546 \text{ m}$$

$$\overline{\sigma}_y = \sqrt{\frac{1}{M}\sum_{n=1}^{M}(\overline{y}-y)^2} = 4.807 \text{ m}$$

$$\overline{\sigma}_z = \sqrt{\frac{1}{M}\sum_{n=1}^{M}(\overline{z}-z)^2} = 5.954 \text{ m}$$

$$\overline{\sigma}_{v_x} = \sqrt{\frac{1}{M}\sum_{n=1}^{M}(\overline{v}_x-v_x)^2} = 0.913 \text{ m/s}$$

$$\overline{\sigma}_{v_y} = \sqrt{\frac{1}{M}\sum_{n=1}^{M}(\overline{v}_y-v_y)^2} = 3.153 \text{ m/s}$$

$$\overline{\sigma}_{v_z} = \sqrt{\frac{1}{M}\sum_{n=1}^{M}(\overline{v}_z-v_z)^2} = 2.97 \text{ m/s}$$

$$\overline{\sigma}_{a_x} = \sqrt{\frac{1}{M}\sum_{n=1}^{M}(\overline{a}_x-a_x)^2} = 0.941 \text{ m/s}^2$$

$$\overline{\sigma}_{a_y} = \sqrt{\frac{1}{M}\sum_{n=1}^{M}(\overline{a}_y-a_y)^2} = 2.302 \text{ m/s}^2$$

$$\overline{\sigma}_{a_z} = \sqrt{\frac{1}{M}\sum_{n=1}^{M}(\overline{a}_z-a_z)^2} = 1.766 \text{ m/s}^2$$

Note that the errors of x, y and z of the second Kalman filter are slightly larger than those of the first Kalman filter. However, the errors of $v_x$, $v_y$, $v_z$, $a_x$, $a_y$, and $a_z$ of the second Kalman filter are smaller than those of the first Kalman filter, especially the $a_y$ and $a_z$ components. After step 103, the errors of coordinates are small, but those of velocities and accelerations are relatively large. Thus, the second Kalman filter has more effect on velocities and accelerations than on the coordinates.

FIGS. 6A-6I show the prediction errors in step 104, $T_p=1$ ms, $\sigma_x=\sigma_y=\sigma_z=1$ m, $\sigma_{vx}=\sigma_{vy}=\sigma_{vz}=1$ m/s, and $\sigma_{ax}=\sigma_{ay}=\sigma_{az}=40\,0$ m/s².

In practice, the target coordinates can be estimated by using the first Kalman filter, and the velocities and accelerations can be estimated by using the second Kalman filter.

Figure 7:
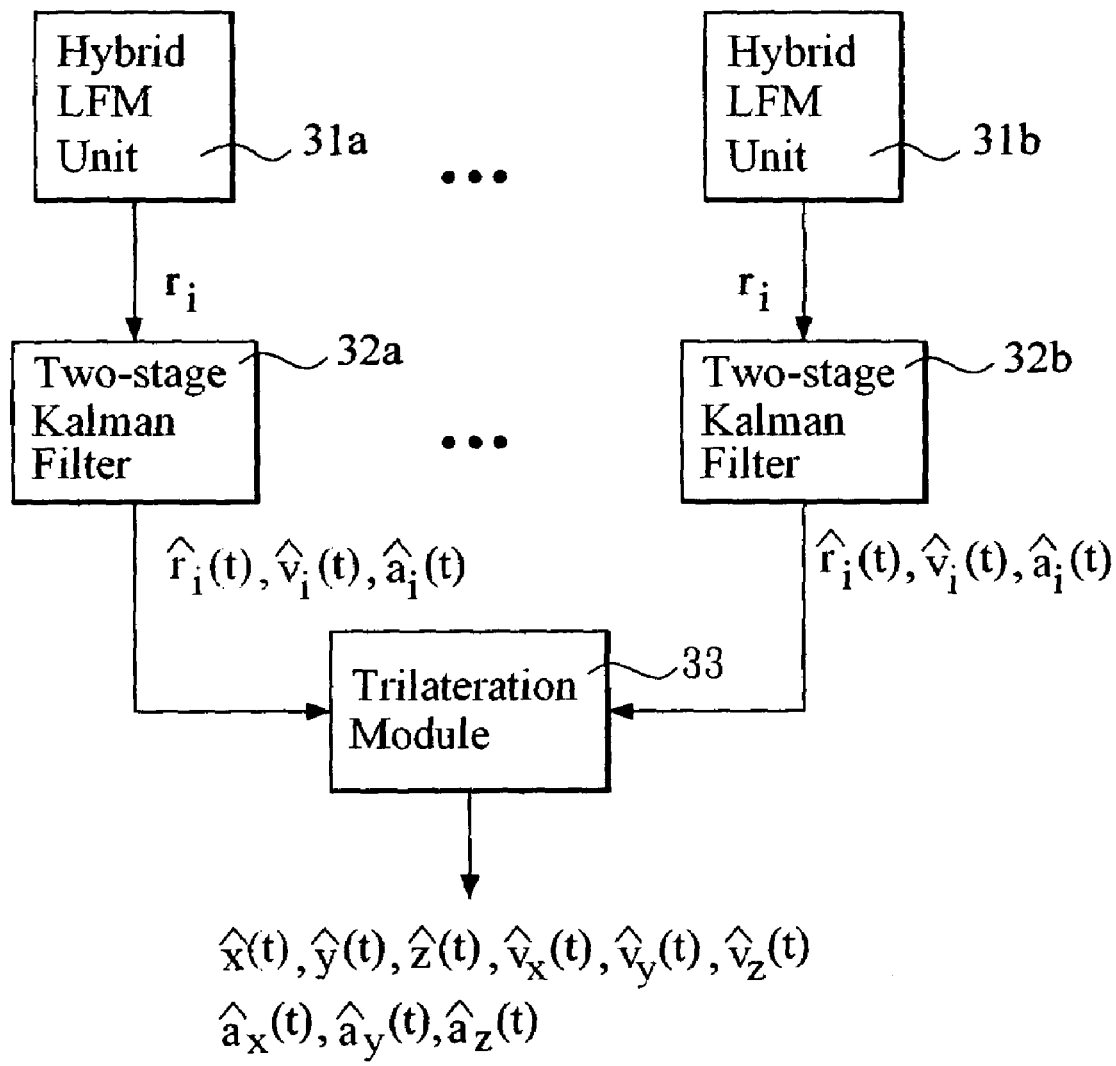
FIG. 7 shows a schematic view of the procedure of using a conventional two-stage Kalman filter to estimate the target kinetic parameters.
Figure 8A:
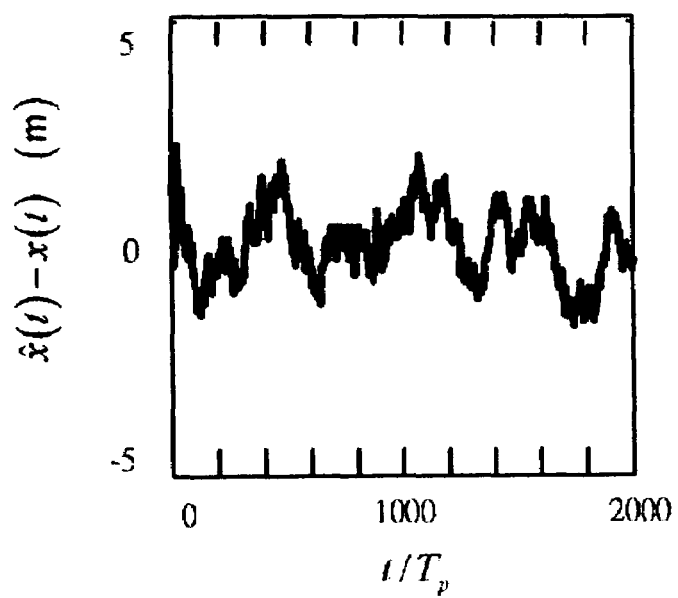
FIGS. 8A-8I show the prediction errors using the two-stage Kalman filter.
Figure 8B:
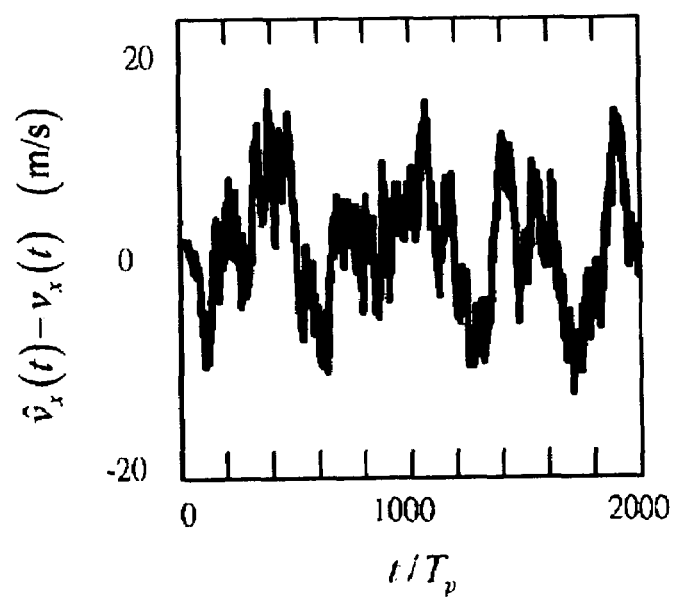
Figure 8C:
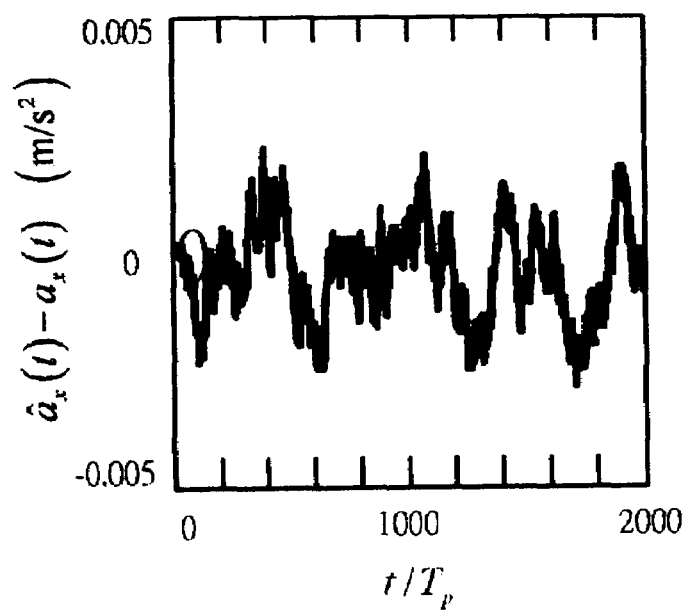
Figure 8D:
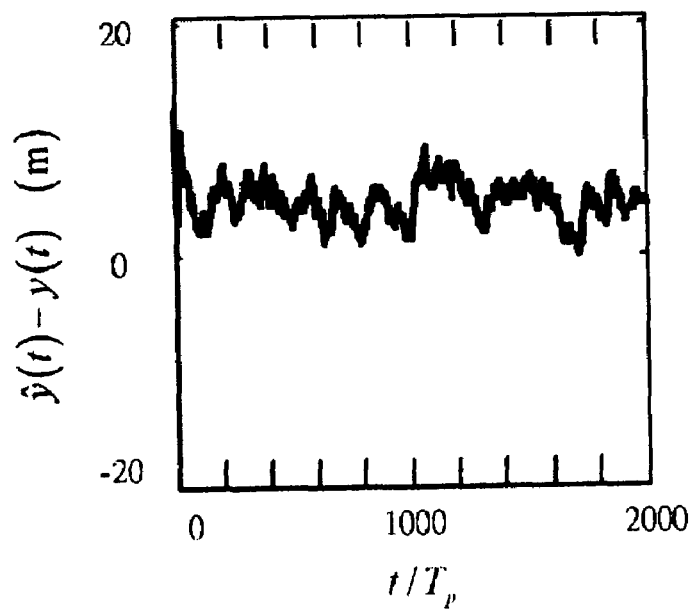
Figure 8E:
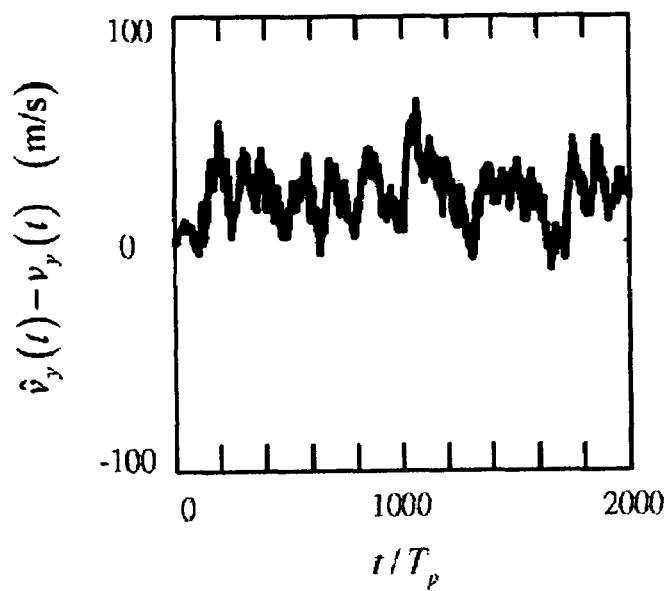
Figure 8F:
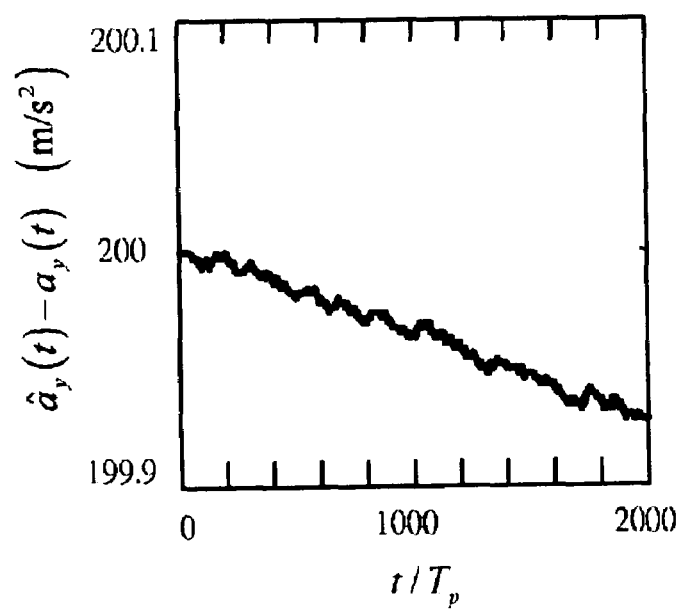
Figure 8G:
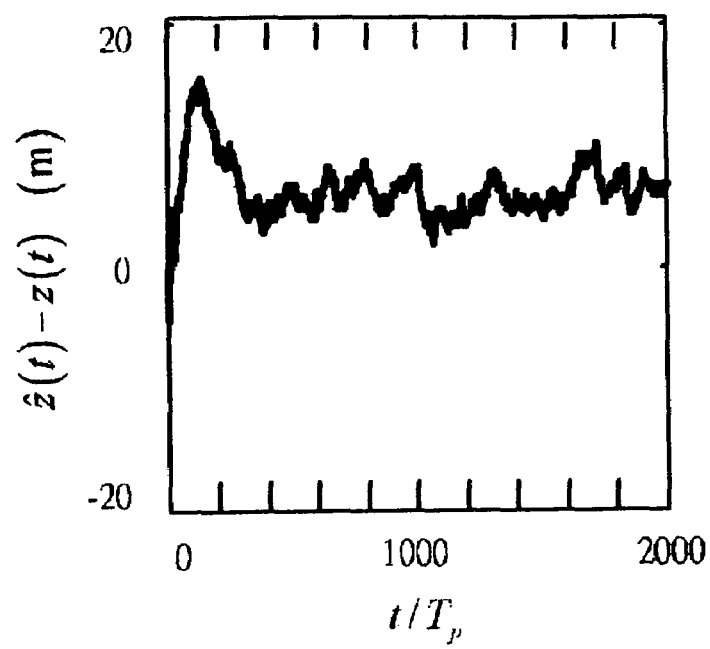
Figure 8H:
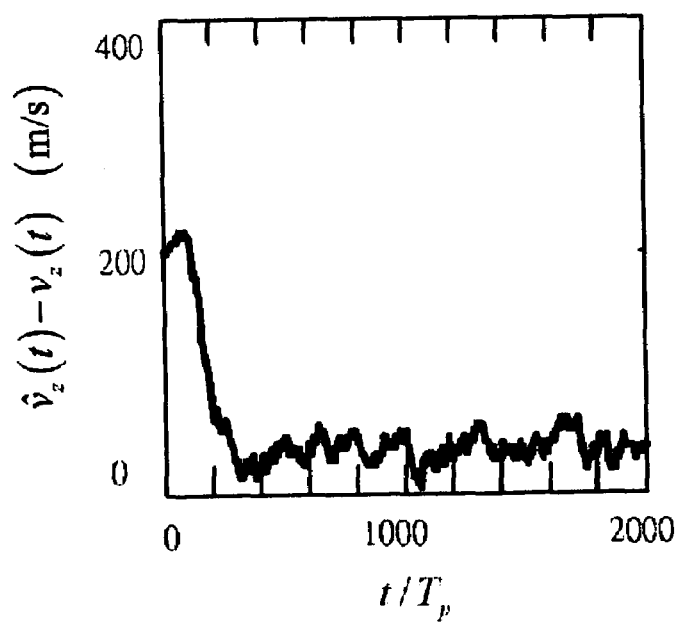
Figure 8I:
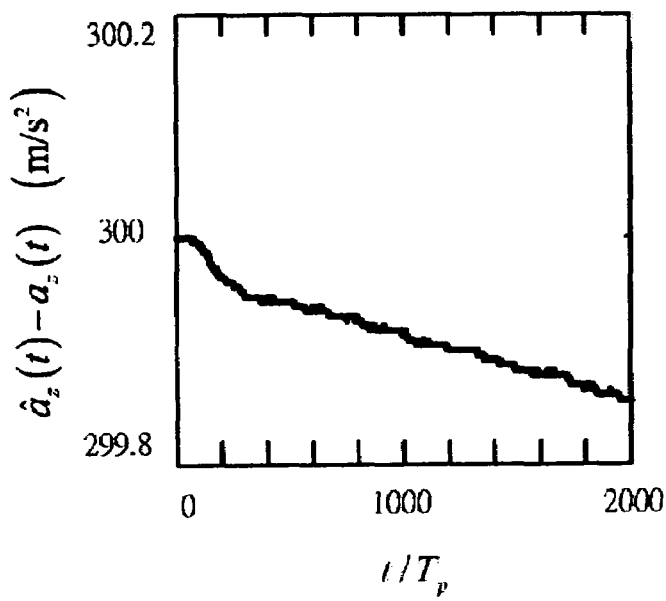

FIG. 7 shows a schematic view of the procedure of using a conventional two-stage Kalman filter to estimate the target kinetic parameters. The first step is to determine the range $r_i$ using the LFM echoes from three sensors, then send these data to the two-stage Kalman filter to estimate $\hat{r}_i(t)$, $\hat{v}_i(t)$ and $\hat{a}_i(t)$. The second step is to use trilateration in equations (20)-(24) to calculate $\hat{x}(t)$, $\hat{y}(t)$, $\hat{z}(t)$, $\hat{v}_x(t)$, $\hat{v}_y(t)$, $\hat{v}_z(t)$, $\hat{a}_x(t)$, $\hat{a}_y(t)$ and $\hat{a}_z(t)$.

FIGS. 8A-8I show the prediction errors using the two-stage Kalman filter, $T_p=1$ ms, $\sigma_r=1$ m, $\sigma_{vx}=\sigma_{vy}=\sigma_{vz}=1$ m/s and $E\{a^2\}=160,000$ m²/s⁴. During $1,000\, T_p \leq t \leq 2,000\, T_p$, the errors of x, y, and z are within 2 m, 10 m and 10 m, respectively, the errors of $v_x$, $v_y$, and $v_z$ are within 15 m/s, 50 m/s and 50 m/s, respectively, and the errors of $a_x$, $a_y$, and $a_z$ are within 0.002 m/s², 200 m/s² and 300 m/s², respectively.

As shown in FIG. 8, the convergence time for predicting the acceleration is about 500 seconds. The errors of location, velocity and acceleration are larger than those of predicted by the present invention.

Figure 9:
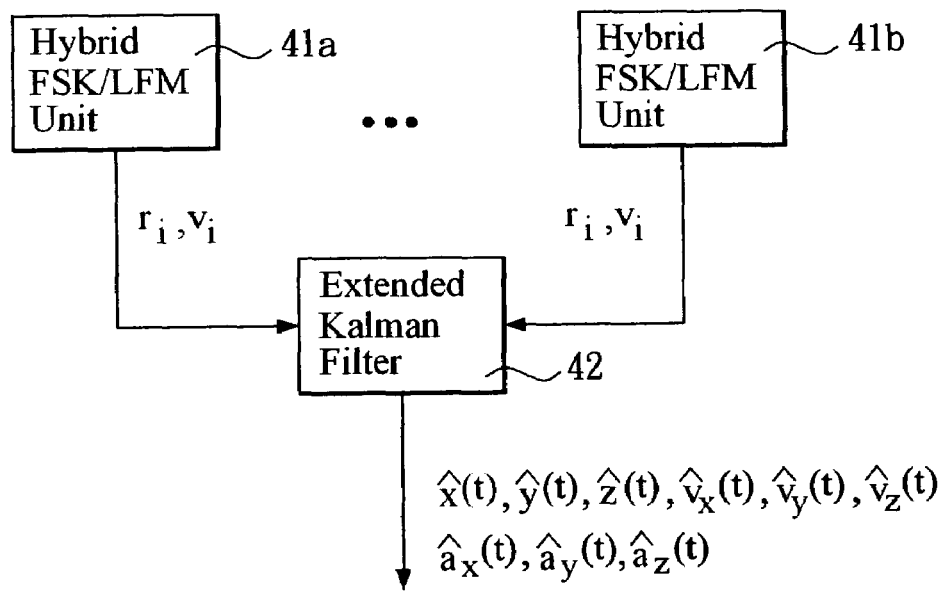
FIG. 9 shows the procedure of a conventional extended Kalman filter to estimate the target kinetic parameters.
Figure 10A:
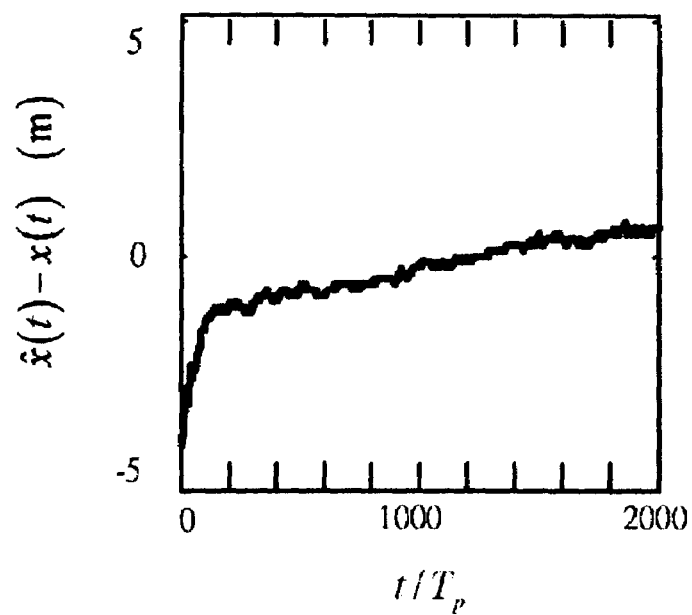
FIGS. 10A-10I show the prediction errors using the extended Kalman filter.
Figure 10B:
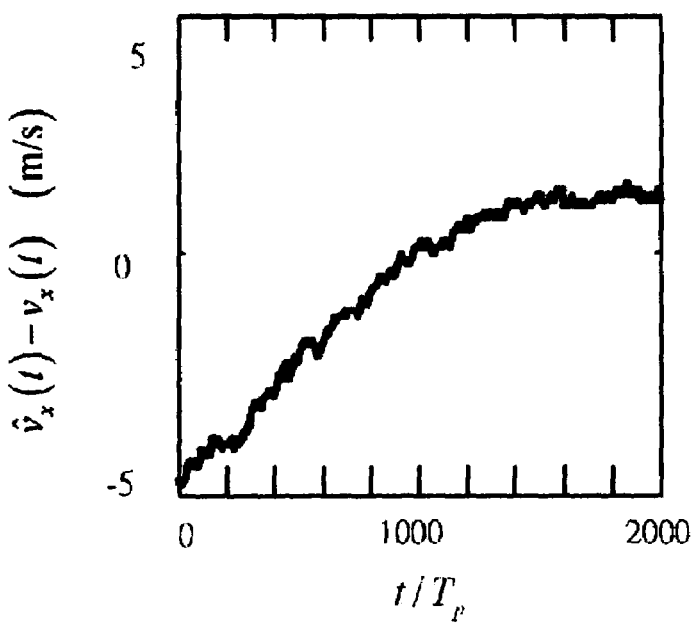
Figure 10C:
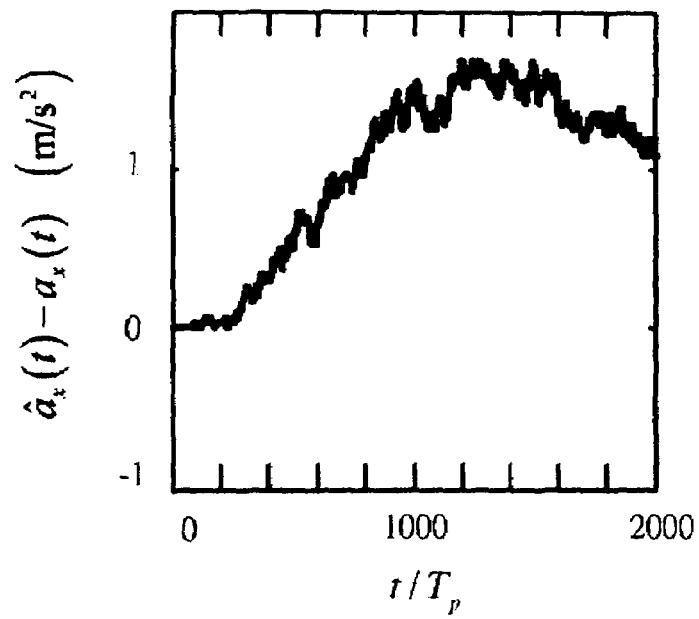
Figure 10D:
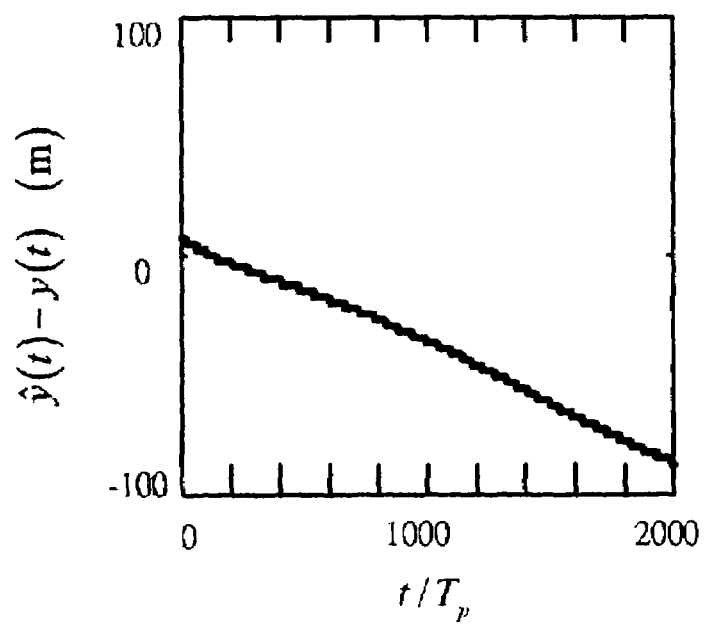
Figure 10E:
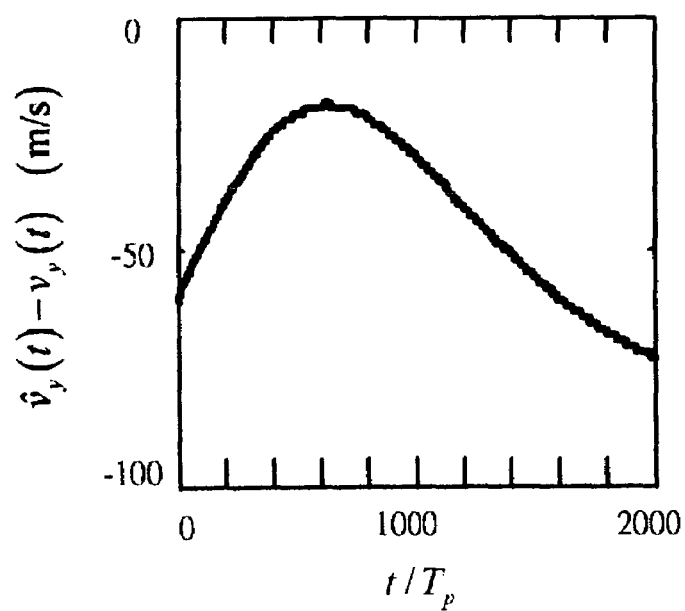
Figure 10F:
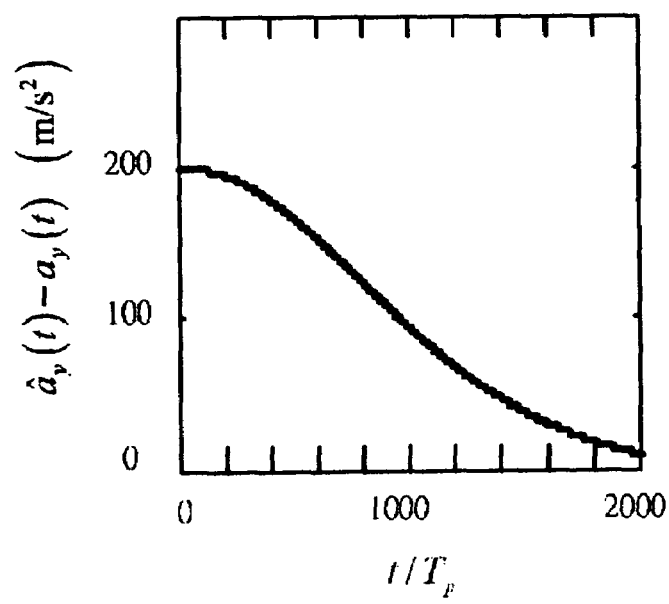
Figure 10G:
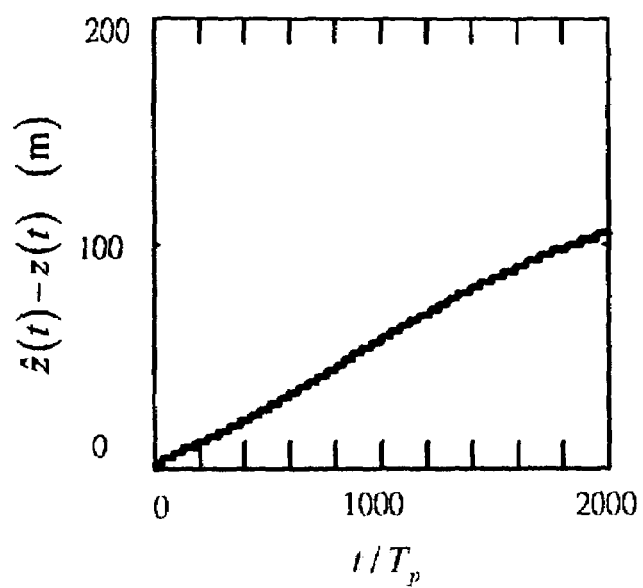
Figure 10H:
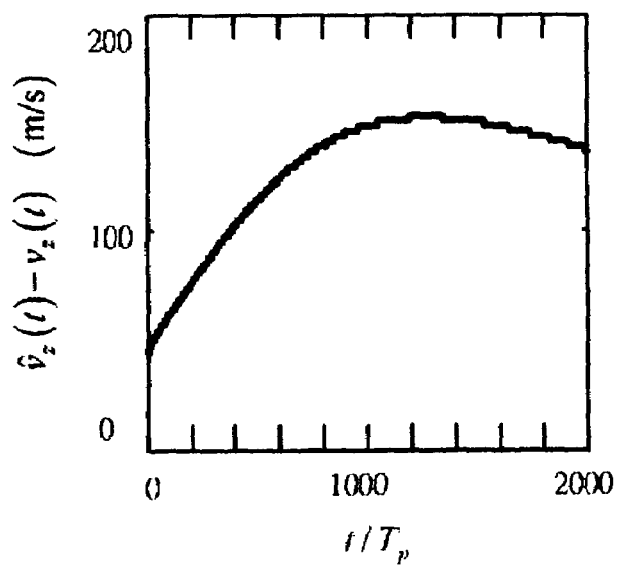
Figure 10I:
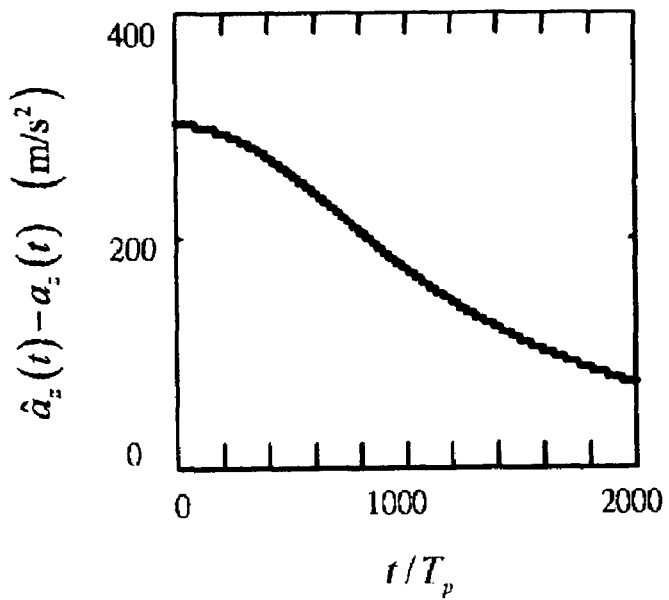

FIG. 9 shows the procedure of a conventional extended Kalman filter to estimate the target kinetic parameters. The first step is to determine the range $r_i$ and $v_i$ using the hybrid FSK/LFM echoes from three sensors, and then send these data to the extended Kalman filter to estimate $\hat{x}(t)$, $\hat{y}(t)$, $\hat{z}(t)$, $\hat{v}_x(t)$, $\hat{v}_y(t)$, $\hat{v}_z(t)$, $\hat{a}_x(t)$, $\hat{a}_y(t)$ and $\hat{a}_z(t)$.

FIGS. 10A-10I show the prediction errors using the extended Kalman filter $T_p=1$ ms, $\sigma_r=1$ 1 m, $\sigma_v=1$ m/s, and $\sigma_a=400$ m/s$^2$.

During $1{,}000\,T_p \leq t \leq 2{,}000\,T_p$, the errors of x, y, and z are within 0.6 m, 85 m and 110 m, respectively, the errors of $v_x$, $v_y$, and $v_z$ are within 1.2 m/s, 70 m/s and 150 m/s, respectively, and the errors of $a_x$, $a_y$, and $a_z$ are within 1.6 m/s$^2$, 90 m/s$^2$ and 170 m/s$^2$, respectively. These errors are larger than those of the present invention.

Figure 11:
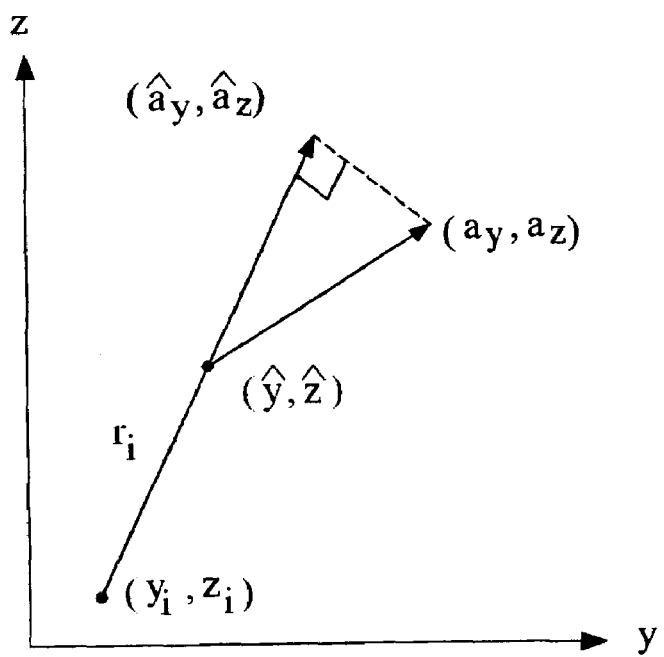
FIG. 11 shows the difference between the acceleration of the moving target and that estimated from the received data using the extended Kalman filter.

FIG. 11 shows the difference between the acceleration of the moving target and the received data from the extended Kalman filter. If only the measurement data from one sensor is used in the extended Kalman filter, the estimated acceleration will be the projection of the real value in the direction from the sensor to the target. As shown in FIG. 11, the following can be obtained $$\hat{a}_x = \frac{\hat{x} - x_i}{r_i} a_i(t)$$

$$\hat{a}_y = \frac{\hat{y} - y_i}{r_i} a_i(t)$$

$$\hat{a}_z = \frac{\hat{z} - z_i}{r_i} a_i(t)$$

where x, y, z, $a_x$, $a_y$, and $a_z$ are the values from the moving target to the reference point, $\hat{a}_x$, $\hat{a}_y$ and $\hat{a}_z$ are the estimated accelerations of the i-th sensor by using the extended Kalman filter, and $r_i$ is the observed range from the i-th sensor at $(x_i, y_i, z_i)$.

To determine the interception point, using Patriot as an example, which has the maximum range of 70 km and the ceiling of 24 km. When the target missile approaches (0, 4400, 4800) meter at t=4 s, it will fall within the impact range of the Patriot.

Table 1 shows the errors of predicted coordinates at t=4 s.

TABLE 1

| Error of | TS/OSKF | TSLKF | EKF |
|---|---|---|---|
| x (m) | 9.475 | 10.318 | 5.3 |
| y (m) | 23.268 | 478.351 | 222 |
| z (m) | 8.866 | 746.772 | 548 |

Figure 12:
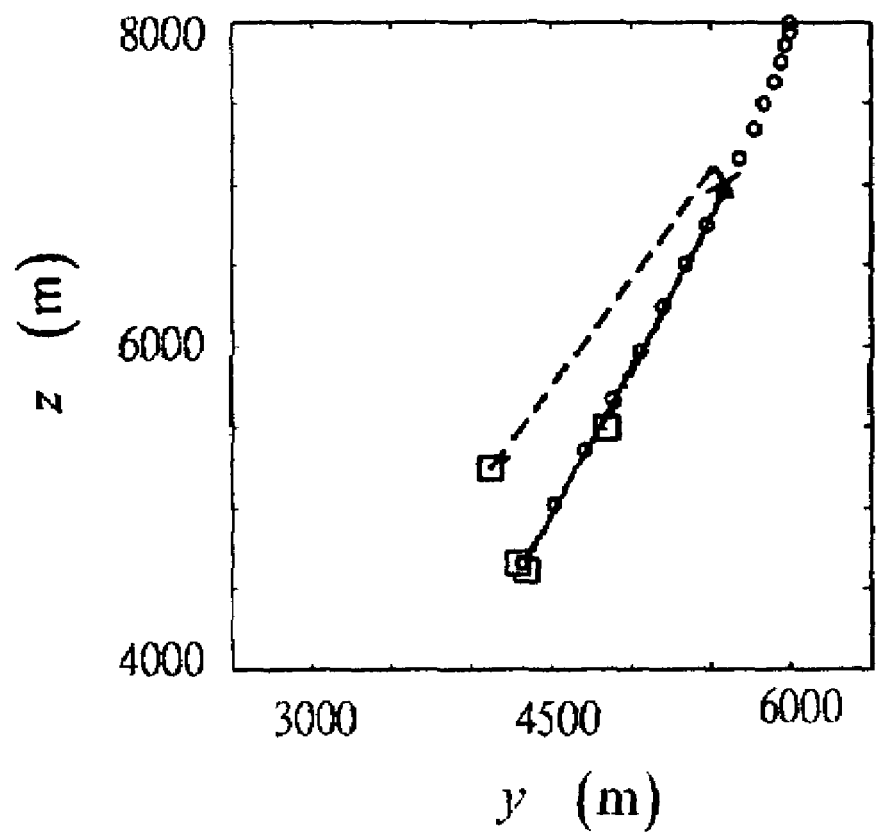
FIG. 12 shows the estimated target trajectories by the preferred embodiment of the present invention, the conventional two-stage Kalman filter and the conventional extended Kalamn filter, respectively.

FIG. 12 shows the estimated target trajectories by the preferred embodiment of the present invention (represented by line -), the conventional two-stage linear Kalman filter (represented by line -.-) and the conventional extended Kalamn filter (represented by line - -:), respectively, and line o-o is the real target tradjectory, where x: t=2 s and ◇ t=4 s.

As shown in FIG. 12, the predicted error of the estimated target coordinates at t=4 s by using the present invention are $e_x$=9.475 m, $e_y$=23.268 m, and $e_z$=8.866 m, the predicted error using the two-stage linear Kalman filter are $e_x$=10.318 m, $e_y$=478.351 m, and $e_x$=746.772 m, and the predicted error using the extended Kalman filter are $e_x$=5.3 m, $e_y$=222 m, and $e_z$=548 m. Note that the convergence time of the two-stage linear Kalman filter is very long, and the estimated accelerations are closer to zero. Thus, the predicted trajectory appears as a tangent to the original trajectory at t=2s. The error of the predicted coordinates at t=4s are summarized in the aforementioned Table 1. The predicted trajectory using the present invention is the closest to the actual trajectory.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for predicting a trajectory of an air-to-surface target missile, the method comprising the following steps:
    (a) detecting a plurality of echo wave signals from the target missile through a plurality of sensors deployed at various locations relative to the target missile;
    (b) extracting at least one range distance and at least one radial velocity, respectively, from the detected echo wave signals from the sensors by using a hybrid FSK/LFM unit;
    (c) using a filter to filter the range distance and the radial velocity computed by the hybrid FSK/LFM unit to estimate a relative distance, a relative velocity, and a relative acceleration, respectively, of the target missile; and
    (d) applying trilateration on the relative distance, the relative velocity, and the relative acceleration of the target missile estimated by the filter to obtain a location, a velocity and an acceleration of the target missile along x, y, z directions.

2. The method as claimed in claim 1, wherein in step (c), the range distance and the radial velocity computed by the hybrid FSK/LFM unit are filtered by a two-stage linear Kalman filter to estimate the relative distance, the relative velocity, and the relative acceleration, respectively, of the target missile.

3. The method as claimed in claim 1, wherein after step (d), the method further comprises a step of using three one-stage linear Kalman filters to receive respectively the location, the velocity and the acceleration generated by the trilateration.

4. A method for predicting a trajectory of an air-to-surface target missile, the method comprising the following steps:
    (a) detecting a plurality of echo wave signals from the target missile through a plurality of sensors deployed at various locations relative to the target missile;
    (b) extracting at least one range distance and at least one radial velocity, respectively, from the detected echo wave signals from the sensors by using a hybrid FSK/LFM unit;
    (c) using a two-stage linear Kalman filter to filter the range distance and the radial velocity computed by the hybrid FSK/LFM unit to estimate a relative distance, a relative velocity, and a relative acceleration, respectively, of the target missile; and
    (d) according to the relative distance, the relative velocity, and the relative acceleration of the target missile estimated by the two-stage linear Kalman filter, obtaining a location, a velocity and an acceleration of the target missile along x, y, z directions.

5. The method as claimed in claim 4, wherein in step (b), the range distance and the radial velocity of the target missile are respectively computed by hybrid FSK/LFM units.

6. The method as claimed in claim 4, wherein after step said (d), the method further comprising a step of using three one-stage linear Kalman filters to receive respectively the location, the velocity and the acceleration generated by the trilateration.

7. A system for predicting a trajectory of an air-to-surface target missile, comprising:
- a plurality of sensors deployed at various locations relative to the target missile to detect a plurality of echo wave signals from the target missile;
- a plurality of hybrid FSK/LFM units connected to the sensors to receive and extract at least one range distance and at least one radial velocity from the detected echo wave signals of the sensors;
- a plurality of linear Kalman filters connected to the hybrid FSK/LFM units to filter the range distance and the radial velocity computed by the hybrid FSK/LFM unit to estimate a relative distance, a relative velocity, and a relative acceleration, respectively, of the target ASM; and
- a trilateration module connected to the linear Kalman filters for applying trilateration on the relative distance, the relative velocity, and the relative acceleration of the target missile estimated by the linear Kalman filter to obtain a location, a velocity and an acceleration of the target missile along x, y, z directions.

8. The system as claimed in claim 7, wherein the linear Kalman filters are two-stage linear Kalman filters.

9. The system as claimed in claim 7, wherein the trilateration module is further connected to a plurality of one-stage linear Kalman filters to receive respectively the location, the velocity and the acceleration generated by the trilateration.

* * * * *